United States Patent
Lee et al.

(10) Patent No.: US 11,044,115 B1
(45) Date of Patent: Jun. 22, 2021

(54) SYSTEM, METHOD, AND APPARATUS PROVIDING ISOLATION FOR A HIGH-SPEED COMMUNICATION INTERFACE WITH OPTIMIZED SIGNAL INTEGRITY

(71) Applicant: MOTOROLA SOLUTIONS, INC., Chicago, IL (US)

(72) Inventors: Wai Mun Lee, Ipoh (MY); Peter J. Bartels, Loxahatchee, FL (US); Yoke Peir Lim, Bayan Lepas (MY); Kah Khoon Khoo, Butterworth (MY)

(73) Assignee: Motorola Solutions, Inc., Chicago, IL (US)

( * ) Notice: Subject to any disclaimer, the term of this patent is extended or adjusted under 35 U.S.C. 154(b) by 10 days.

(21) Appl. No.: 16/722,610

(22) Filed: Dec. 20, 2019

(51) Int. Cl.
*H04L 12/40* (2006.01)
*H04L 12/24* (2006.01)
*H04L 25/02* (2006.01)
*H02H 3/10* (2006.01)

(52) U.S. Cl.
CPC ......... *H04L 12/40032* (2013.01); *H02H 3/10* (2013.01); *H04L 25/0266* (2013.01); *H04L 41/0681* (2013.01)

(58) Field of Classification Search
CPC ........... H04L 12/40032; H04L 25/0266; H04L 41/0681; H02H 3/10
See application file for complete search history.

(56) References Cited

U.S. PATENT DOCUMENTS

| 5,835,534 | A | 11/1998 | Kogure | |
|---|---|---|---|---|
| 2002/0101261 | A1* | 8/2002 | Karabatsos | H03K 17/693 326/83 |
| 2007/0183175 | A1* | 8/2007 | Sakiyama | H02M 3/07 363/123 |
| 2013/0234198 | A1 | 9/2013 | Khambaty et al. | |
| 2019/0056708 | A1 | 2/2019 | Kumar et al. | |

OTHER PUBLICATIONS 5 kV RMS and 3.75 kV RMS, Dual-Channel LVDS Gigabit Isolators—Data Sheet ADS4654/ADN4655/ADN4656, Analog Devices, 2018.

* cited by examiner

*Primary Examiner* — Duc C Ho
(74) *Attorney, Agent, or Firm* — Baker Botts L.L.P.

(57) ABSTRACT

A portable battery-operated communication device includes a high-speed communication bus, a first high-speed communication processor coupled to the bus and configured for transferring communication signals to a second high-speed communication processor over the bus, and an isolation circuit for the bus with a first terminal coupled to the bus and configured to receive a first communication signal from the first processor via the bus, and a first resistor that is coupled to the first terminal and configured to protect the first terminal from an overcurrent failure condition, in which the isolation circuit is configured to match impendences between the isolation circuit and bus, isolate series inductance associated with the first terminal, protect the first terminal from an overvoltage failure while maintaining signal integrity of the first communication signal, and pass through the first communication signal from the first terminal to a second terminal coupled to the high-speed communication bus.

20 Claims, 8 Drawing Sheets

SYSTEM, METHOD, AND APPARATUS PROVIDING ISOLATION FOR A HIGH-SPEED COMMUNICATION INTERFACE WITH OPTIMIZED SIGNAL INTEGRITY

BACKGROUND OF THE INVENTION

Feature rich portable electronic devices, including portable electronic communication devices, require ever increasing amounts of data to be transmitted. For example, radios have evolved from simple analog devices with modest data requirements to multifunction computing systems in a small footprint in which large amounts of data are transmitted at a high rate. Data transmission and usage thereof are growing in terms of speed of transmission, capacity of transmission, and usage due to increases in demand for more data consumption and storage. The design of high-speed interfaces may be limited by the form factor of rich portable electronic devices, which incorporate expanding functionality in a shrinking footprint. Solutions applicable to non-portable electronic devices may be unsuitable for portable electronic devices, and similarly, solutions applicable to portable electronic devices may be unsuitable for feature rich portable electronic communication devices due to added functionality in a smaller design.

The design of high-speed interfaces for data transmission are also limited by the introduction and adoption of standard specifications for interfaces, which often require certification by passing various tests for particular features. For example, these standards and the consortiums that promulgate related specifications often achieve higher speeds by discouraging the use of capacitive devices.

The design of high-speed interfaces for data transmission is further limited by the environment of the location where the interface operates. Hazardous locations are sometimes defined as places where fire or explosion hazards may potentially exist due to flammable gases, flammable liquid-produced vapors, combustible liquid-produced vapors, combustible dusts, or ignitable fibers or filings that are present in the air in quantities sufficient to produce explosive or ignitable mixtures. Such hazards may be sometimes or continuously present in Division 1 hazardous locations. Electrical equipment that is meant to be installed in such hazardous locations, including land mobile radios and other portable battery-operated electronic communication devices, should be specially designed and tested to ensure that they do not initiate an explosion due to arcing contacts or the high surface temperature of the equipment.

In such hazardous locations, the design of an electronic device may be restricted in terms of available energy to satisfy compliance with one or more safety standards, including Appareils destinés à être utilisés en ATmosphères EXplosibles (ATEX), Underwriters Laboratories (UL), and International Electrotechnical Commission System for Certification to Standards Relating to Equipment for Use in Explosive Atmospheres (IECEx). In addition, the design of an electronic device for Intrinsic Safety (IS) certification may require overvoltage protection, overcurrent protection, or isolation to avoid initiating an explosion during a fault. However, this requirement adds components to the device resulting in degraded communication interfaces that fail one or more certification tests and lead to errors in data transmission unsuitable for high-speed communications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1:
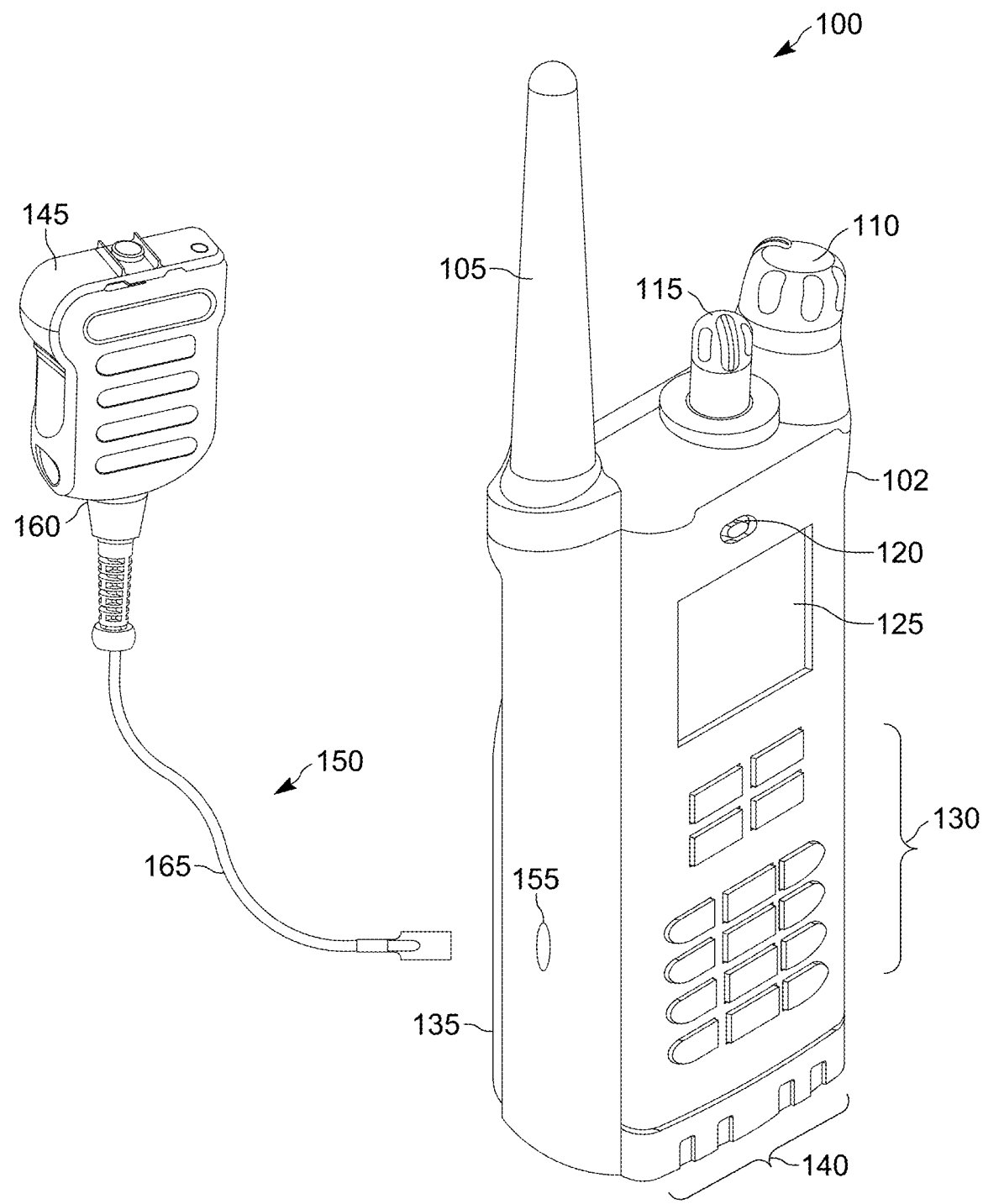
FIG. 1 is a front perspective view of an example portable communication system with a high-speed communication interface for operation in a hazardous environment, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, method, and apparatus components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are systems, methods, and apparatuses providing isolation for a high-speed communication interface with optimized signal integrity. In one embodiment, a disclosed portable battery-operated communication device includes a high-speed communication bus, a first high-speed communication processor coupled to the high-speed communication bus, and an isolation circuit for the high-speed communication bus. The first high-speed communication processor may be for transferring communication signals to a second high-speed communication processor over the high-speed communication bus. The isolation circuit may include a first terminal and a first resistor. The first terminal may be coupled to the high-speed communication bus and configured to receive a first communication signal from the first high-speed communication processor via the high-speed communication bus. The first resistor may be configured to protect the first terminal from an overcurrent failure condition. The isolation circuit may be configured to match an impedance of the isolation circuit to an impedance associated with the high-speed communication bus, isolate series inductance associated with the first terminal, protect the first terminal from an overvoltage failure condition while maintaining signal integrity of the first communication signal, and pass through the first communication signal from the first terminal to a second terminal coupled to the high-speed communication bus.

In various embodiments, the isolation circuit may also include a first capacitor chain coupled in parallel across the first resistor to provide galvanic isolation for the first terminal. The first capacitor chain may include one or more capacitors and pass through the first communication signal from the first terminal to the second terminal, which may include passing a low-frequency signal associated with the first communication signal through the first resistor and passing a high-frequency signal associated with the first communication signal through the first capacitor chain. The high-frequency signal associated with the first communication signal may have a fundamental frequency of 4 MHz or greater.

In various embodiments, the high-speed communication bus may include one or more data lines of a universal serial bus that may be configured for bi-directional high-speed communication. The high-speed communication bus and data lines of the bus may have an associated impedance of 90 ohm differential and the impedance of the isolation circuit may be 45 to 50 ohm single-ended. In various embodiments, the impedance of the isolation circuit may range from about 45 to 50 ohm single-ended based on one or more properties associated with the printed circuit board, including but not limited to the dielectric properties, trace thickness, spacing, and routing.

In various embodiments, the isolation circuit may further include a second resistor coupled to the second terminal and configured to protect the second terminal from the overcurrent failure condition. The isolated series inductance may further be associated with the second terminal that may be configured to receive a second communication signal from the high-speed communication bus. The isolated circuit may be configured to protect the second terminal from the overvoltage failure condition while maintaining signal integrity of the second communication signal.

In some embodiments, the isolation circuit may further include a second capacitor chain, which may include one or more capacitors, coupled in parallel across the second resistor to provide galvanic isolation for the second terminal. The isolated circuit may be configured to pass through the second communication signal from the second terminal to the first terminal, which may include passing a low-frequency signal associated with the second communication signal through the second resistor and passing a high-frequency signal associated with the second communication signal through the second capacitor chain. The high-frequency signal associated with the second communication signal may have a fundamental frequency of 4 MHz or greater In various embodiments, the first terminal may be configured to operate at a first predefined voltage and the second terminal may be configured to operate at a second predefined voltage. The isolation circuit may be intrinsically safe and configured to operate in a hazardous environment. Circuits or devices used in hazardous environments may contain safety components to protect users from potentially gaseous or explosive elements by, for example, preventing a spark, static discharge, or limiting heat energy below a sufficient level that may cause an explosion under normal or failure conditions. Circuits or devices may limit energy in one or more forms, including but not limited to power, heat, voltage, current, capacitance, and inductance, to safe levels for a particular environment. The moderated energy may be associated with any suitable part of the circuit to provide a barrier from other parts of the circuit exposed to the hazardous environment. In various embodiments, a first capacitance associated with the first predefined voltage may be less than a first predefined capacitance limit and a second capacitance associated with the second predefined voltage may be less than a second predefined capacitance limit. The first predefined voltage may be greater than the second predefined voltage, and the first predefined capacitance limit may be less than the second predefined capacitance limit.

In various embodiments, the isolation circuit may also include one or more suppression diodes and one or more inductors. The suppression diodes may be coupled to the first resistor and the inductors may be coupled to the suppression diodes and coupled in series with the first resistor. The suppression diodes may be configured to protect the first terminal from an overvoltage failure condition, and the inductors may be configured to convert a capacitance associated with the suppression diodes to an impedance associated with the suppression diodes that matches the impedance associated with the high-speed communication bus thereby maintaining signal integrity of the first communication signal. In various embodiments, the suppression diodes may include a switching diode and a zener diode coupled in series between at least one of the inductors and a ground reference.

In one embodiment, a disclosed method for isolated high-speed communication includes receiving a communication signal at a first terminal of an isolation circuit, isolating series inductance associated with the first terminal using a resistor coupled in series to the first terminal, matching an impedance of the isolation circuit to an impedance associated with a high-speed communication bus, protecting the first terminal from an overvoltage failure condition while maintaining signal integrity of the communication signal, and passing the communication signal to a second terminal of the isolation circuit. The first terminal and second terminal of the isolation circuit may be coupled to a high-speed communication bus. The impedance of associated with a high-speed communication bus may correspond to the input impedance at the first terminal.

In various embodiments, the high-speed communication bus may include one or more data lines of a universal serial bus that may be configured for bi-directional high-speed communication. The high-speed communication bus and data lines of the bus may have an associated impedance of 90 ohm differential and an impedance of the isolation circuit may be between 45 and 50 ohm single-ended. In various embodiments, the impedance of the isolation circuit may range from about 45 to 50 ohm single-ended based on one or more properties associated with the printed circuit board, including but not limited to the dielectric properties, trace thickness, spacing, and routing.

In various embodiments, the impedance of the isolation circuit at the first terminal may be matched to the impedance associated with the high-speed communication bus using a first inductor coupled to the first terminal. In various embodiments, the disclosed method for isolated high-speed communication may include galvanically isolating the first terminal with a capacitor chain coupled in parallel across a resistor in which the capacitor chain and resistor are coupled to the first terminal. The capacitor chain may include one or more capacitors and the resistor may be configured to protect the first terminal from an overcurrent failure condition.

In various embodiments, the method may also include converting a capacitance associated with one or more suppression diodes to an impedance associated with the suppression diodes and maintaining signal integrity of the communication signal. The impedance associated with the suppression diodes may match the impedance associated with the high-speed communication bus using one or more inductors that may be coupled in series to the first resistor. The inductors may be used to maintain the signal integrity of the communication signal. The inductors may include the first inductor coupled to the first terminal. The suppression diodes may be configured to protect the first terminal from the overvoltage failure condition. In various embodiments, the suppression diodes may include a switching diode and a zener diode coupled in series between at least one of the inductors and a ground reference. In various embodiments, passing the communication signal may include passing a low-frequency signal associated with the communication signal through the first resistor and passing a high-frequency signal associated with the communication signal through the first capacitor chain. The high-frequency signal may have a fundamental frequency of 4 MHz of greater.

In one embodiment, a portable battery-operated communication system may include a first high-speed communication processor coupled to a second high-speed communication processor over a high-speed communication bus, and an isolation circuit for the high-speed communication bus. The isolation circuit may include a first terminal and a second terminal each coupled to the high-speed communication bus and first resistor coupled to the first terminal. The first terminal may be configured to receive a first communication signal from the first high-speed communication processor via the high-speed communication bus and protect the first terminal from an overcurrent failure condition. The isolation circuit may be configured to match an impedance of the isolation circuit to an impedance associated with the high-speed communication bus, isolate series inductance associated with the first terminal, protect the first terminal from an overvoltage failure condition while maintaining signal integrity of the first communication signal, and pass through the first communication signal from the first terminal to the second terminal.

A high-speed communication bus may include impedance discontinuities, which may be caused by one or more of the sources, including but not limited to the high-speed communication bus connector interface, changes in dielectric properties of a flex circuit, and board-to-board connectors. In various embodiments, the isolation circuit may be configured to perform both matching an impedance of the isolation circuit to an impedance associated with the high-speed communication bus and protecting from an overvoltage failure condition while maintaining signal integrity of a communication signal.

In various embodiments, the isolation circuit of the portable battery-operated communication system may also include a first capacitor chain that may be coupled in parallel across the first resistor to provide galvanic isolation for the first terminal between the first high-speed communication processor and the second high-speed communication processor. The first capacitor chain may include one or more capacitors. In some embodiments, passing through the first communication signal from the first terminal to the second terminal may include passing a low-frequency signal associated with the first communication signal through the first resistor and passing a high-frequency signal associated with the first communication signal through the first capacitor chain. The high-frequency signal associated with the first communication signal may have a fundamental frequency of 4 MHz or greater.

The first high-speed communication processor and second high-speed communication processor may be co-located in the same portable battery-operated communication device or may be located in separate devices. As another example, the first high-speed communication processor may be implemented as a main processor in a portable battery-operated communication device, such as a baseband processor, and the second high-speed communication processor may be implemented as a secondary processor or co-processor, such as an application processor, in the same portable battery-operated communication device as the primary high-speed communication processor. As another example, the first high-speed communication processor may be located in a portable battery-operated communication device, such as a radio, and the second high-speed communication processor may be located in a remote portable accessory that is external to the portable battery-operated communication device. In various embodiments, the high-speed communication bus may include one or more data lines of a universal serial bus that may be configured for bi-directional high-speed communication. The high-speed communication bus and the data lines of the bus may have an associated impedance of 90 ohm differential and the impedance of the isolation circuit may be between 45 and 50 ohm single-ended. In various embodiments, the impedance of the isolation circuit may range from about 45 to 50 ohm single-ended based on one or more properties associated with the printed circuit board, including but not limited to the dielectric properties, trace thickness, spacing, and routing.

In various embodiments, the isolation circuit of the portable battery-operated communication system may further include a second resistor coupled to the second terminal and a second capacitor chain coupled in parallel across the second resistor to provide galvanic isolation for the second terminal to be between the second processor and the first processor. The second resistor may be configured to protect the second terminal from the overcurrent failure condition and the second capacitor chain may include one or more capacitors. The isolated series inductance may further be associated with the second terminal that may be configured to receive a second communication signal from the second processor via the high-speed communication bus that may be configured for bi-directional high-speed communication. The isolated circuit may be further configured to protect the second terminal from the overvoltage failure condition while maintaining the signal integrity of the second communication signal and pass through the second communication signal from the second terminal to the first terminal, in which the second resistor may be configured to pass through a low-frequency signal associated with the second communication signal and the second capacitor chain may be configured to pass through a high-frequency signal associated with the second communication signal. The high-frequency signal may have a fundamental frequency of 4 MHz of greater.

In various embodiments, the isolation circuit may also include one or more suppression diodes and one or more inductors. The suppression diodes may be coupled to the first resistor and the inductors may be coupled to the suppression diodes and coupled in series with the first resistor. The suppression diodes may be configured to protect the first terminal from an overvoltage failure condition, and the inductors may be configured to convert a capacitance associated with the suppression diodes to an impedance associated with the suppression diodes that matches the impedance associated with the high-speed communication bus thereby maintaining signal integrity of the first communication signal. In various embodiments, the suppression diodes may include a switching diode and a zener diode coupled in series between at least one of the inductors and a ground reference. In some embodiments, the suppression diodes may be coupled in series with a first and second resistor to protect the first and second terminals from an overvoltage failure condition.

In some embodiments, the first high-speed communication processor may be implemented as a main processor and the second high-speed communication processor may be implemented as a secondary processor. The primary processor and isolation circuit may be configured to operate at a first predefined voltage, and the secondary processor may be configured to operate at a second predefined voltage. The isolation circuit may be intrinsically safe and configured to operate in a hazardous environment. Circuits or devices used in hazardous environments may contain safety components to protect users from potentially gaseous or explosive elements by, for example, preventing a spark, static discharge, or limiting heat energy below a sufficient level that may cause an explosion under normal or failure conditions. Circuits or devices may limit energy in one or more forms, including but not limited to power, heat, voltage, current, capacitance, and inductance, to safe levels for a particular environment. In various embodiments, a first capacitance associated with the first predefined voltage may be less than a first predefined capacitance limit and a second capacitance associated with the second predefined voltage may be less than a second predefined capacitance limit. The first predefined voltage may be greater than the second predefined voltage, and the first predefined capacitance limit may be less than the second predefined capacitance limit.

As previously noted, data transmission and usage thereof are growing in terms of speed of transmission, capacity of transmission, and usage due to increases in demand for more data consumption and storage. Increasing data transmission speeds may not be possible for products used in hazardous locations (e.g., so-called "HAZLOC products") and subject to UL Division 1 and ATEX standards for operation in hazardous locations, including, for example, standards related to intrinsically safe design and operation (e.g., so-called "Intrinsically Safe products"). The HAZLOC and Intrinsically Safe products may require one or more types of isolation and protection, such as overcurrent failure condition protection, overvoltage failure condition protection, and isolation from potentially dangerous voltages associated with electrical surges. Such products ordinarily may satisfy requirements for one or more types of isolation and protection by adding one or more components that result in an increased capacitance of the product. At the same time, portable communication devices are becoming more complex with additional functionality and connectivity features, all of which typically further increases capacitance and inductance, which is unsuitable for products operating in hazardous locations with potentially gaseous or explosive atmosphere requiring Intrinsically Safe products. In addition, data transmission speeds continue to increase and thereby require less capacitance to ensure signal integrity of communications. For example, a transformer may be used for isolation, but adds size, cost, power consumption, and capacitance to the system unsuitable for high-speed communication. As another example, a resistance may be used to match the transmission line, but the high resistance compromises signal integrity for high-speed communication.

As described herein, systems, methods, and apparatuses providing isolation for a high-speed communication interface with optimized signal integrity for a portable battery-operated communication may prevent sparks and large currents rushing in due to energy released, for example, from internal capacitances, internal inductances, or other sources of energy. In portable battery-operated electronic communication devices, isolation with, for example, a transformer, may be unacceptable due to the size, cost, and power consumed by the isolation device. For example, using a transformer requires additional size and space, and draws additional power. In addition, the transformer may ordinarily reduce signal integrity for high-speed communications, decrease battery life, and require a wired power charging cable for a portable battery-operated electronic communication device. As described herein, the isolation circuit may include a first capacitor chain coupled in parallel across the first resistor to the first terminal to provide galvanic isolation and pass through a high-frequency signal. Galvanic isolation may enable protection from electrical surges, including but not limited to fast electrical transients and electrostatic discharge. This approach may allow for high-speed communication while providing protection from an overcurrent failure condition by avoiding the use of isolation devices, such as transformers, that are unacceptable for battery-operated electronic communication devices due to the size, cost, and power consumption of the isolation device.

The isolation circuit may also include one or more suppression diodes to protection the first terminal from an overvoltage failure condition. For example, a zener diode may be coupled in series with a switching diode that reduces the effective capacitance of the zener diode. In addition, the suppression diodes may be coupled to one or more inductors that are coupled in series with the first resistor. This approach may maintain signal integrity of communication signals by reducing a capacitance associated with the suppression diodes and converting that capacitance to an impedance associated with the suppression diodes that matches the impedance associated with a high-speed communication bus. The isolation circuits described herein may maintain signal integrity of high-speed communication signals while satisfying the requirements of devices that operate in hazardous locations.

Referring now to FIG. 1, there is provided a front perspective view of an example portable communication system 100 with a high-speed communication interface for operation in a hazardous environment, in accordance with some embodiments. Portable communication system 100 may be designed for operation in hazardous environments, such as an environment subject to HAZLOC equipment protection standards or requiring UL Intrinsically Safe devices. Portable communication system 100 may include portable battery-operated communication device 102 and portable accessory 145. Portable battery-operated communication device 102 may be implemented, for example, as a portable battery-operated radio and portable accessory 145 may be implemented, for example, as a remote speaker microphone. Portable battery-operated communication device 102 may be implemented to support one or more types of communication, including but not limited to a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In some embodiments, the radio may support a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

In various embodiments, portable battery-operated communication system 100 may include portable battery-operated communication device 102 with antenna 105 for the transmission and reception of communication signal(s). Antenna 105 may communicate using one or more communication standards including, but not limited to, radio communication and wireless communication. Portable battery-operated communication device 102 may further include battery 135. Battery 135 may be embedded in portable battery-operated communication device 102 (not shown) or may be removable from portable communication system 100. Battery 135 may be charged via one or more terminals 140. In some embodiments, battery 135 may be charged wirelessly using a wireless charging coil (not shown). Battery 135 may provide power to one or more components of portable battery-operated communication device 102, including but not limited to a high-speed communication processor configured to support one or more types of communications, such as communication signal(s) associated with antenna 105. The processor may operate at a predefined voltage suitable for operation in hazardous environments, such as an environment subject to HAZLOC equipment protection standards or requiring UL Intrinsically Safe devices.

In various embodiments, portable battery-operated communication device 102 may include one or more input devices or accessories. In some embodiments, a plurality of front-facing buttons 130 may be used to input information to portable battery-operated communication device 102. In various embodiments, one or more microphones 120 may be used to receive audio input to portable battery-operated communication device 102. In some embodiments, primary display 125 of portable battery-operated communication device 102 may include a touch input interface to control portable communication system 100. In some embodiments, portable battery-operated communication device 102 may include one or more knobs (110 and 115). For example, knob 110 may be used to adjust the volume of the audio output from portable battery-operated communication device 102 or portable accessory 145 and knob 115 may be used to adjust the communication channel used by portable battery-operated communication device 102 or portable accessory 145.

In some embodiments, an portable accessory 145 may be communicatively coupled to portable battery-operated communication device 102 via a high-speed communication interface 150. The high-speed communication interface 150, also known as a high-speed communication bus, may support high-speed communication between portable accessory 145 and portable battery-operated communication device 102. For example, high-speed communication interface 150 may be coupled to a first high-speed communication processor, which may be included in portable battery-operated communication device 102, and a second remote high-speed communication processor, which may be included in portable accessory 145.

High-speed communication interface 150 may be integrated in a wired cable 165 and one or more ports, such as port 155 of portable battery-operated communication device 102 and port 160 of portable accessory 145. In some embodiments, high-speed communication interface 150 may include a plurality of signal lines to transmit communications, such as one or more supply lines, one or more data lines, one or more control lines, one or more clock lines, or any suitable combination of supply, data, control, or clock lines. In some embodiments, one or more signal lines of high-speed communication interface 150 may be paired together as a differential pair. For example, a positive differential data line and a negative differential data line may collectively transmit data over high-speed communication interface 150. In some embodiments, high-speed communication interface 150 may be configured for bi-directional high-speed communication to transmit and receive information to and from portable battery-operated communication device 102 and portable accessory 145.

Portable battery-operated communication device 102 and portable accessory 145 of portable communication system 100 may be designed to operate in hazardous environments and may be configured to be intrinsically safe to protect users in hazardous environments that are potentially gaseous or explosive by preventing the trigger of an explosion due to an electric spark or static discharge. In such hazardous environments, a barrier may limit the amount of energy in one or more forms, including but not limited to power, heat, voltage, current, capacitance, and inductance, to safe levels between circuitry that is protected and circuitry that is exposed to a potentially gaseous or explosive atmosphere. Portable battery-operated communication device 102 may include an isolation circuit configured to protect components from overcurrent failure conditions, overvoltage failure conditions, and to provide galvanic isolation. The isolation circuitry (not shown) may be coupled to high-speed communication interface 150 between a high-speed communication processor, such as a processor integrated in a radio, and port 155.

In various embodiments, the isolation circuit may provide a barrier to limit the amount of energy in one or more forms, including but not limited to power, voltage, current, capacitance, and inductance, to safe levels between those components protected from a hazardous environment and those exposed to a potentially gaseous or explosive atmosphere. The components protected from a hazardous environment may include, but are not limited to, a first high-speed communication processor, and the components exposed to a potentially gaseous or explosive atmosphere may include, but are not limited to, a second high-speed communication processor or a remote second high-speed communication processor in an external accessory, such as portable accessory 145. The first high-speed communication processor, such as a baseband processor, may process communications, such as radio communications. In some embodiments, the first high-speed communication processor may load and execute a real-time operating system. The second high-speed communication processor, such as an application processor, may process user applications, such as a user interface. In some embodiments, the second high-speed communication processor may load and execute a mobile operation system.

In some embodiments, the components protected from a hazardous environment may operate at higher voltage than the voltage of components exposed to a potentially gaseous or explosive atmosphere. For example, the protected circuit components may be supplied with 8.4 volts and the exposed circuit components may be supplied with 6.4 volts. The isolation circuit may isolate the capacitance for the exposed components to the lower voltage supply. In addition, the isolation circuit may limit the total amount of capacitance subject to the higher voltage supply, which may protect users in hazardous environments that are potentially gaseous or explosive.

Figure 2A:
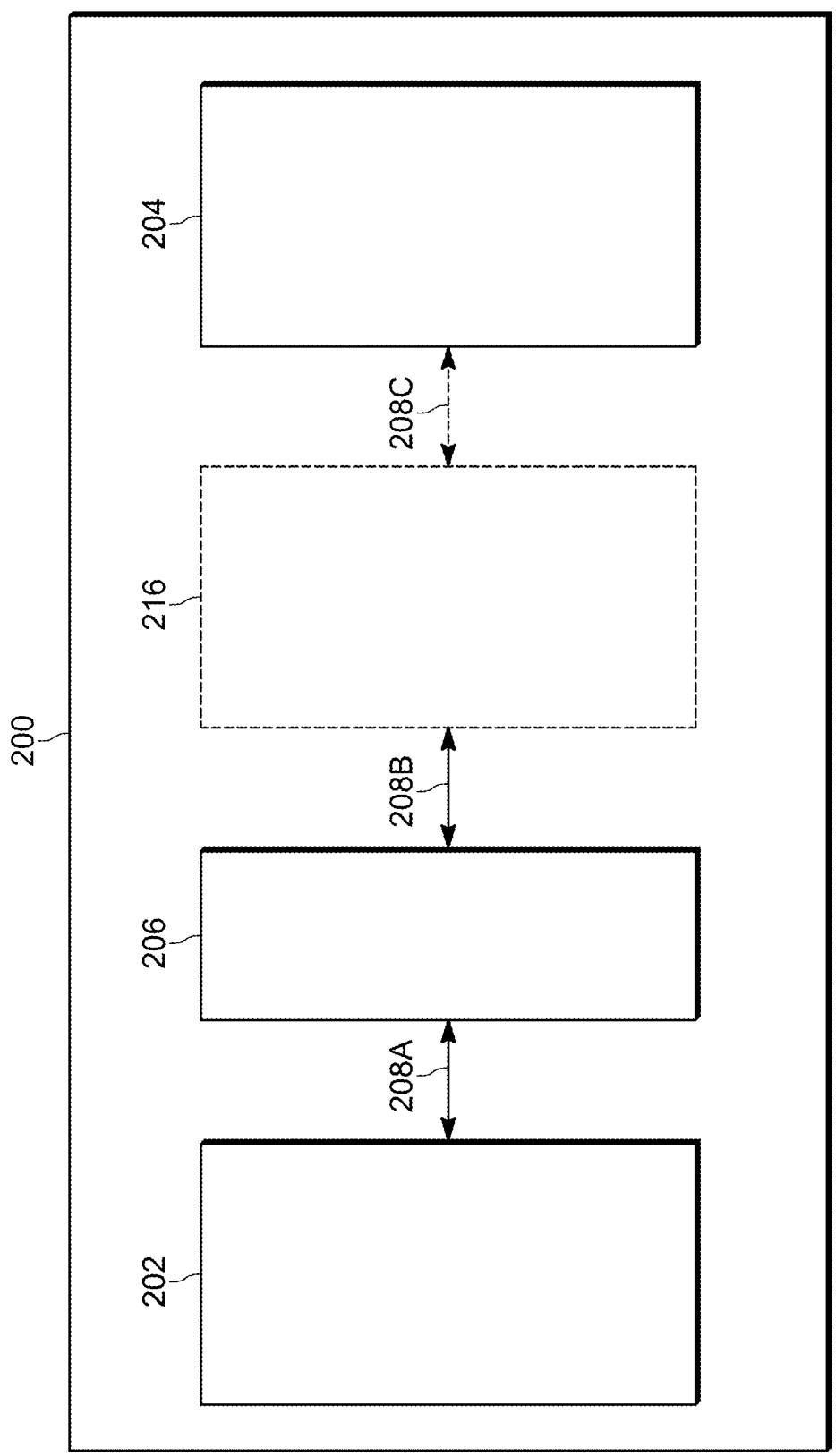
FIG. 2A is a block diagram illustrating selected elements of an example portable communication device with protection and galvanic isolation for an internal high-speed communication interface with optimized signal integrity, in accordance with some embodiments.

Referring now to FIG. 2A, there is provided a block diagram illustrating selected elements of an example portable communication device 200 with protection and galvanic isolation for an internal high-speed communication interface with optimized signal integrity, in accordance with some embodiments. Portable communication device 200 may include a first high-speed communication processor 202 and second high-speed communication processor 204 coupled over high-speed communication bus 208. First high-speed communication processor 202, may be coupled to second high-speed communication processor 204 via a high-speed communication bus 208A, isolation circuit 206, and high-speed communication bus 208B. In some embodiments, first high-speed communication processor 202 and second high-speed communication processor 204 may also be coupled by an interface impedance discontinuity 216 and high-speed communication bus 208C. Interface impedance discontinuity 216 may reflect one or more discontinuities caused by one or more connections or connectors associated with high-speed communication bus 208. High-speed communication bus 208A, 208B, and 208C may form multiple portions of the same high-speed communication bus 208 to transmit communications between first high-speed communication processor 202 and second high-speed communication processor 204. In some embodiments, high-speed communication bus 208A, 208B, and 208C may include one or more signal lines to transmit communications. For example, the signal lines may include one or more supply lines, one or more data lines, one or more control lines, one or more clock lines, or any suitable combination of supply, data, control, or clock lines. In some embodiments, multiple signal lines of high-speed communication bus 208 may be paired together as a differential pair. For example, a positive differential data line and a negative differential data line may collectively transmit data over high-speed communication bus 208A, 208B, and 208C. In some embodiments, high-speed communication bus 208A, 208B, and 208C may be configured for bi-directional high-speed communication to transmit and receive information to and from first high-speed communication processor 202 and second high-speed communication processor 204.

In various embodiments, the high-speed communication bus 208A, 208B, and 208C may be implemented as a Universal Serial Bus (USB), Mobile Industry Process Interface (MIPI), Ethernet, High-Definition Multimedia Interface (HDMI), Radio Frequency Front-End Control Interface (RFFE), QLINK, QuickCharge (QC) protocol interface, or another suitable high-speed interface. The high-speed communication bus 208 may support transmission of communications at a data rate corresponding to signals having a fundamental frequency of 4 MHz or greater, including but not limited to 480 megabits/second (High Speed), 5 gigabits/second (SuperSpeed), 10 gigabits/second or greater (SuperSpeed+ and/or Thunderbolt 3), 3.96 gigabits/second or greater (HDMI version 1.0 or greater), radio frequency front-end (RFFE) signals (e.g., 52 MHz), and QLINK signals. The high-speed communication bus 208 may also support handshaking and idle states that transmit communication signals at a much lower data rate corresponding to low-frequency signals that may be associated with direct current (DC) signaling, including but not limited to a DC current in the form of a DC voltage supply.

First high-speed communication processor 202 may be implemented as a main processor, such as a baseband processor, to support communications for mission critical operations, including but not limited to, one or more communications over high-powered land mobile radio (LMR), public safety long-term evolution (PS LTE), and mission critical push-to-talk longer long-term evolution (MSPTT over LTE). First high-speed communication processor 202 may load and execute a real-time operating system (RTOS) to support mission critical communications without indeterminant delays in processing incoming or outgoing communications. Second high-speed communication processor 204 may be implemented as a secondary processor or co-processor, such as an application processor, to support consumer communications, such as global positioning system (GPS) transmissions, broadband and wireless local area networking (e.g., Wi-Fi), Bluetooth audio, and consumer long-term evolution (LTE). Second high-speed communication processor 204 may load and execute a consumer-level operating system, such as implementations based on Android™ or open source software (e.g., Tizen), which may execute with indeterminant delays in processing incoming and outgoing communications.

In various embodiments, a first predefined voltage level associated with first high-speed communication processor 202 may be greater than a second predefined voltage level associated with second high-speed communication processor 204. For example, first high-speed communication processor 202 may be associated with a voltage supply of 8.4 volts and second high-speed communication processor 204 may be associated with a voltage supply of 6.4 volts. High-speed communication bus 208A and a terminal of isolation circuit 206 may be associated with the first predefined voltage level, and high-speed communication bus 208B and another terminal of isolation circuit 206 may be associated with the second predefined voltage level. In some embodiments, interface impedance discontinuity 216 and high-speed communication bus 208C may be associated with the second predefined voltage level. In some embodiments, high-speed communication bus 208A, 208B, and 208C may operate at a third predefined voltage level in which high-speed communication bus 208A is exposed to failure conditions associated with the first voltage level, including first high-speed communication processor 202, and high-speed communication bus 208B and 208C is exposed to failure conditions associated with the second voltage level, including second high-speed communication processor 204. For example, high-speed communication bus 208A, 208B, and 208C may operate at 5 volts but be exposed to failure conditions corresponding to other voltage levels, such as an overvoltage failure condition or an overcurrent failure condition.

First high-speed communication processor 202, second high-speed communication processor 204, and other components of portable communication device 200, such as isolation circuit 206, may operate in a hazardous environment which may require circuitry to be intrinsically safe from potentially gaseous or explosive elements. Intrinsically safe circuitry may prevent a spark, static discharge, or heat energy of a sufficient level from causing an explosion under normal or failure conditions by limiting energy in one or more forms, including but not limited to power, heat, voltage, current, capacitance, and inductance, to safe levels for the particular environment. In various embodiments, a first capacitance associated with the first predefined voltage may be less than a first predefined capacitance limit and a second capacitance associated with the second predefined voltage may be less than a second predefined capacitance limit. In addition, the first predefined capacitance limit may be less than the second predefined capacitance limit. The first and second predefined capacitance limits may be defined based on the first and second predefined voltages to limit the total energy to a safe level in a hazardous environment. In addition, the first and second predefined capacitance limits may be defined to comply with one or more requirements, such as HAZLOC requirements, UL Intrinsic Safety requirements, ATEX requirements, or IECEx requirements. For example, the first predefined voltage level may be approximately 8.4 volts and the first predefined capacitance limit may be defined to be approximately 350 microfarads (µF), and the second predefined voltage level may be approximately 6.4 volts and the second predefined capacitance limit may be defined to be approximately 650 to 850 microfarads (µF).

Isolation circuit 206 may be coupled to high-speed communication bus 208A and 208B via two terminals. Operating portable communication device 200 in hazardous environments with potentially gaseous and explosive atmospheres may require the circuitry of portable communication device 200 to be intrinsically safe. These requirements may include protection from one or more failure conditions, such as an overcurrent or overvoltage failure condition, and electrical surges, including but not limited to fast electrical transients and electrostatic discharge. In various embodiments, isolation circuit 206 may provide protection from one or more conditions, such as protection from overcurrent failure conditions with current limiting circuitry (e.g., using a series resistor), protection from overvoltage failure conditions with voltage limiting circuitry (e.g., using suppression diodes), and protection from electrical surges with galvanic isolating circuitry (e.g., using a capacitor chain).

As described herein, additional components, space, cost, and complexity may be avoided, as suitable for portable communication device 200 for public-safety or mission-critical environments, by isolation circuit 206, which matches one or more impedances and provides protection from normal and failure conditions, such as overcurrent and overvoltage failure conditions. Isolation circuit 206 may reduce components, space, cost, and complexity in comparison to separate matching circuits and protection circuits coupled together in which one matching circuit matches the impedance of the communication bus associated with a master device (e.g., $Z_0$), the protection circuit matches the impedance of the line between the matching and protection circuits (e.g., $Z_1$), and the second matching circuit matches the impedance of the line between the matching and protection circuits and any interface impedance discontinuity (e.g., $Z_2$).

Figure 2B:
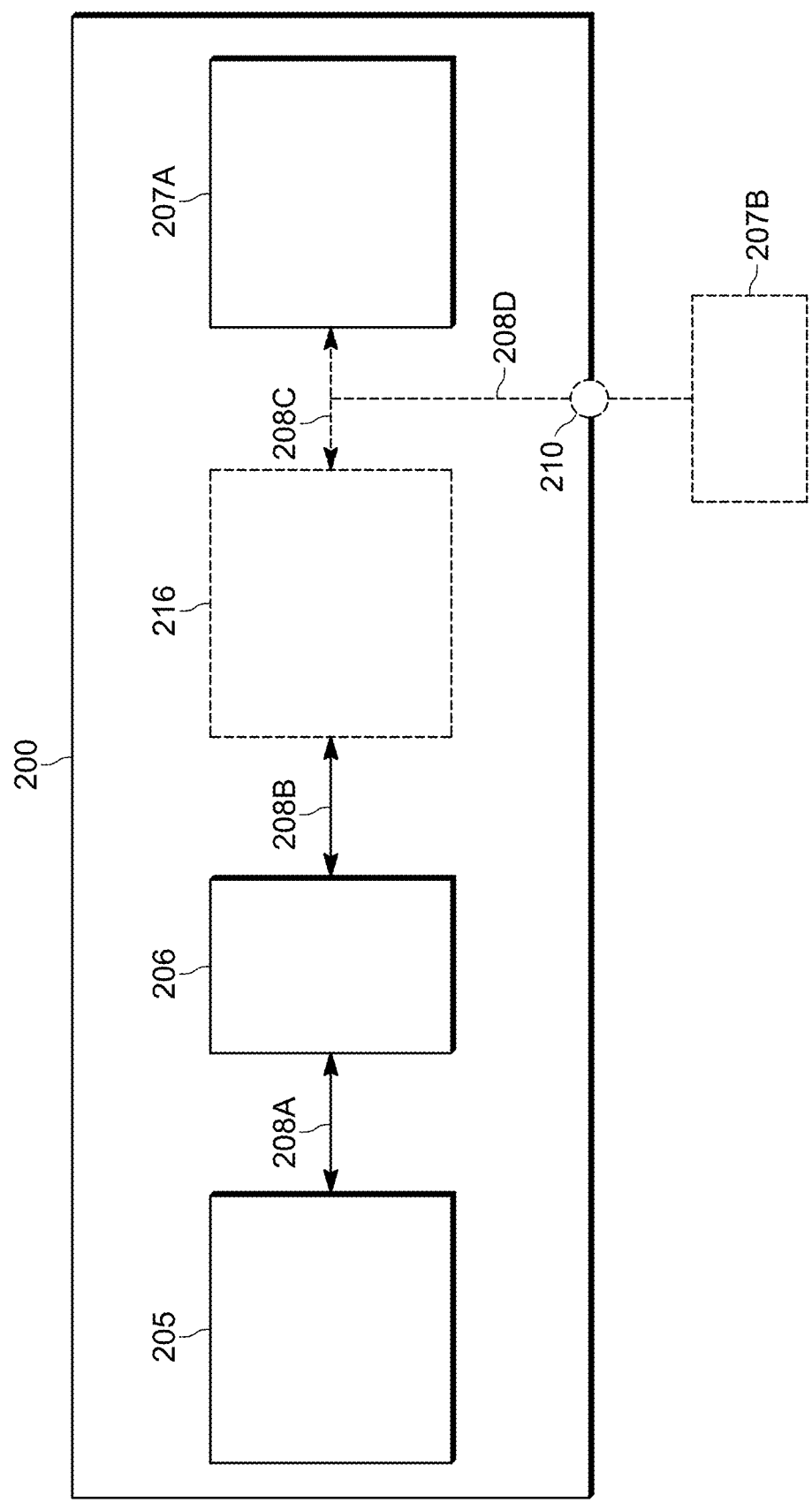
FIG. 2B is a block diagram illustrating selected elements of an example portable communication device with protection and galvanic isolation for a high-speed communication interface to an external portable accessory with optimized signal integrity, in accordance with some embodiments.

Referring now to FIG. 2B, there is provided a block diagram illustrating selected elements of an example portable communication device 200 with protection and galvanic isolation for a high-speed communication interface to an external portable accessory with optimized signal integrity, in accordance with some embodiments. Portable communication device 200 may include a radio 205 and accessory 207, which may be represented by two high-speed communication processors coupled over high-speed communication bus 208.

The first high-speed communication processor of radio 205, may be coupled to the second high-speed communication processor of internal accessory 207A, via a high-speed communication bus 208A, isolation circuit 206, and high-speed communication bus 208B. Internal accessory 207A may be implemented as any suitable accessory in portable communication device 200, such as an option board, which may support one or more optional features, such as an communication interface, and sensors. In some embodiments, radio 205 and accessory 207 may be coupled by an interface impedance discontinuity 216 and high-speed communication bus 208C and 208D. Interface impedance discontinuity 216 may reflect one or more discontinuities caused by one or more connections or connectors associated with high-speed communication bus 208.

In some embodiments, the first high-speed communication processor of radio 205, may be coupled to the second high-speed communication processor of remote portable accessory 207B, via high-speed communication bus 208A, isolation circuit 206, high-speed communication bus 208B, and high-speed communication bus 208D via high-speed communication port 210. In various embodiments, remote portable accessory 207B may be coupled to high-speed communication bus 208D via a high-speed communication port (not shown). Remote portable accessory 207B may be implemented as any suitable accessory external to portable communication device 200, such as a slave device communicatively coupled to portable communication device 200 via a wired cable interface. The slave device may be any suitable accessory, including but not limited to a camera for video, an earpiece, a microphone, and a sensor detection device for environments with potentially hazardous materials.

High-speed communication bus 208A, 208B, 208C, and 208D may form portions of the same high-speed communication bus and may include one or more signal lines to transmit communications between radio 205 and accessory 207. In some embodiments, high-speed communication bus 208A, 208B, 208C, and 208D may include one or more signal lines to transmit communications. For example, the signal lines may include one or more supply lines, one or more data lines, one or more control lines, one or more clock lines, or any suitable combination of supply, data, control, or clock lines. In some embodiments, multiple signal lines of high-speed communication bus 208A, 208B, 208C, and 208D may be paired together as a differential pair. For example, a positive differential data line and a negative differential data line may collectively transmit data over high-speed communication bus 208A, 208B, 208C, and 208D. In some embodiments, high-speed communication bus 208A, 208B, 208C, and 208D may be configured for bi-directional high-speed communication to transmit and receive information to and from radio 205 and accessory 207.

In various embodiments, the high-speed communication bus 208A, 208B, 208C, and 208D may be implemented as a Universal Serial Bus (USB), Mobile Industry Process Interface (MIPI), Ethernet, High-Definition Multimedia Interface (HDMI), Radio Frequency Front-End Control Interface (RFFE), QLINK, QuickCharge (QC) protocol interface, or another suitable high-speed interface. The high-speed communication bus 208A, 208B, and 208C may support transmission of communications at a data rate corresponding to signals having a fundamental frequency of 4 MHz or greater, including but not limited to 480 megabits/second (High Speed), 5 gigabits/second (SuperSpeed), 10 gigabits/second or greater (SuperSpeed+ and/or Thunderbolt 3), 3.96 gigabits/second or greater (HDMI version 1.0 or greater), radio frequency front-end (RFFE) signals (e.g., 52 MHz), and QLINK signals. The high-speed communication bus 208 may also support handshaking and idle states that transmit communications at a much lower data rate corresponding to low-frequency signals that may be associated with direct current (DC) signaling, including but not limited to a DC current passed on a DC voltage supply.

Radio 205 may support one or more types of communication, including but not limited to a direct-mode, conventional, or trunked land mobile radio (LMR) standard or protocol such as ETSI Digital Mobile Radio (DMR), a Project 25 (P25) standard defined by the Association of Public Safety Communications Officials International (APCO), Terrestrial Trunked Radio (TETRA), or other LMR radio protocols or standards. In some embodiments, radio 205 may support a Long Term Evolution (LTE) (including LTE-Advanced or LTE-Advanced Pro compliant with, for example, the 3GPP TS 36 specification series) or 5G (including a new radio (NR) air interface compliant with the 3GPP TS 38 specification series) protocol, among other possibilities, over which multimedia broadcast multicast services (MBMS), single site point-to-multipoint (SC-PTM) services, or Mission Critical Push-to-talk (MCPTT) services may be provided, or over which an open mobile alliance (OMA) push to talk (PTT) over cellular (OMA-PoC), a voice over IP (VoIP), an LTE Direct or LTE Device to Device, or a PTT over IP (PoIP) application may be implemented. Direct mode LTE standards may additionally or alternatively be implemented as well, including but not limited to the LTE Direct device-to-device standard.

Accessory 207, such as internal accessory 207A or remote portable accessory 207B, may receive and transmit data with radio 205 via high-speed communication bus 208A, 208B, 208C, and 208D. Internal accessory 207A may be implemented as any suitable accessory in portable communication device 200, such as an option board, which may support one or more optional features, such as an communication interface, and sensors. Remote portable accessory 207B may be implemented as any suitable accessory external to portable communication device 200, including but not limited to a camera for video, an earpiece, a microphone, and a sensor detection device for environments with potentially hazardous materials, and a smart remote speaker microphone (RSM) with advanced processing of information, such as audio input, audio output, or video input.

In various embodiments, a first predefined voltage level associated with radio 205 may be greater than a second predefined voltage level associated with accessory 207. For example, radio 205 may be associated with a voltage supply of 8.4 volts and accessory 207 may be associated with a voltage supply of 6.4 volts. High-speed communication bus 208A and a terminal of isolation circuit 206 may be associated with the first predefined voltage level, and high-speed communication bus 208B, 208C, and 208D, and another terminal of isolation circuit 206 may be associated with the second predefined voltage level. In some embodiments, high-speed communication bus 208A, 208B, 208C, and 208D may operate at a third predefined voltage level in which high-speed communication bus 208A may be exposed to failure conditions associated with the first voltage level, including radio 205, and high-speed communication bus 208B, 208C, and 208D may be exposed to failure conditions associated with the second voltage level, including accessory 207. For example, high-speed communication bus 208A, 208B, 208C, and 208D may operate at 5 volts but be exposed to failure conditions of other voltage levels, such as overvoltage failure conditions or overcurrent failure conditions.

Radio 205, accessory 207, and other components of portable communication device 200, such as isolation circuit 206, may operate in a hazardous environment which may require the circuitry to be intrinsically safe from potentially gaseous or explosive elements. Intrinsically safe circuitry may prevent a spark, static discharge, or heat energy of a sufficient level from causing an explosion under normal or failure conditions by limiting energy in one or more forms, including but not limited to power, heat, voltage, current, capacitance, and inductance, to safe levels for the particular environment. In various embodiments, a first capacitance associated with the first predefined voltage may be less than a first predefined capacitance limit and a second capacitance associated with the second predefined voltage may be less than a second predefined capacitance limit. In addition, the first predefined capacitance limit may be less than the second predefined capacitance limit. The first and second predefined capacitance limits may be defined based on the first and second predefined voltages to limit the total energy to a safe level in a hazardous environment. In addition, the first and second predefined capacitance limits may be defined to comply with one or more requirements, such as HAZLOC requirements, UL Intrinsic Safety requirements, ATEX requirements, or IECEx requirements. For example, the first predefined voltage level may be approximately 8.4 volts and the first predefined capacitance limit may be defined to be approximately 350 microfarads (µF), and the second predefined voltage level may be approximately 6.4 volts and the second predefined capacitance limit may be defined to be approximately 650 to 850 microfarads (µF).

Similar to the description for FIG. 2A, isolation circuit 206 as described for FIG. 2B may be coupled to high-speed communication bus 208A and 208B via two terminals. Operating portable communication device 200 in hazardous environments with potentially gaseous and explosive atmospheres may require components of portable communication device 200 to be intrinsically safe. These requirements may include protection from one or more failure conditions, such as an overcurrent or overvoltage failure condition, and electrical surges, including but not limited to fast electrical transients and electrostatic discharge. In various embodiments, isolation circuit 206 may provide protection from one or more conditions, such as protection from overcurrent failure conditions with current limiting circuitry (e.g., using a series resistor), protection from overvoltage failure conditions with voltage limiting circuitry (e.g., using suppression diodes), and protection from electrical surges with galvanic isolating circuitry (e.g., using a capacitor chain).

Figure 3:
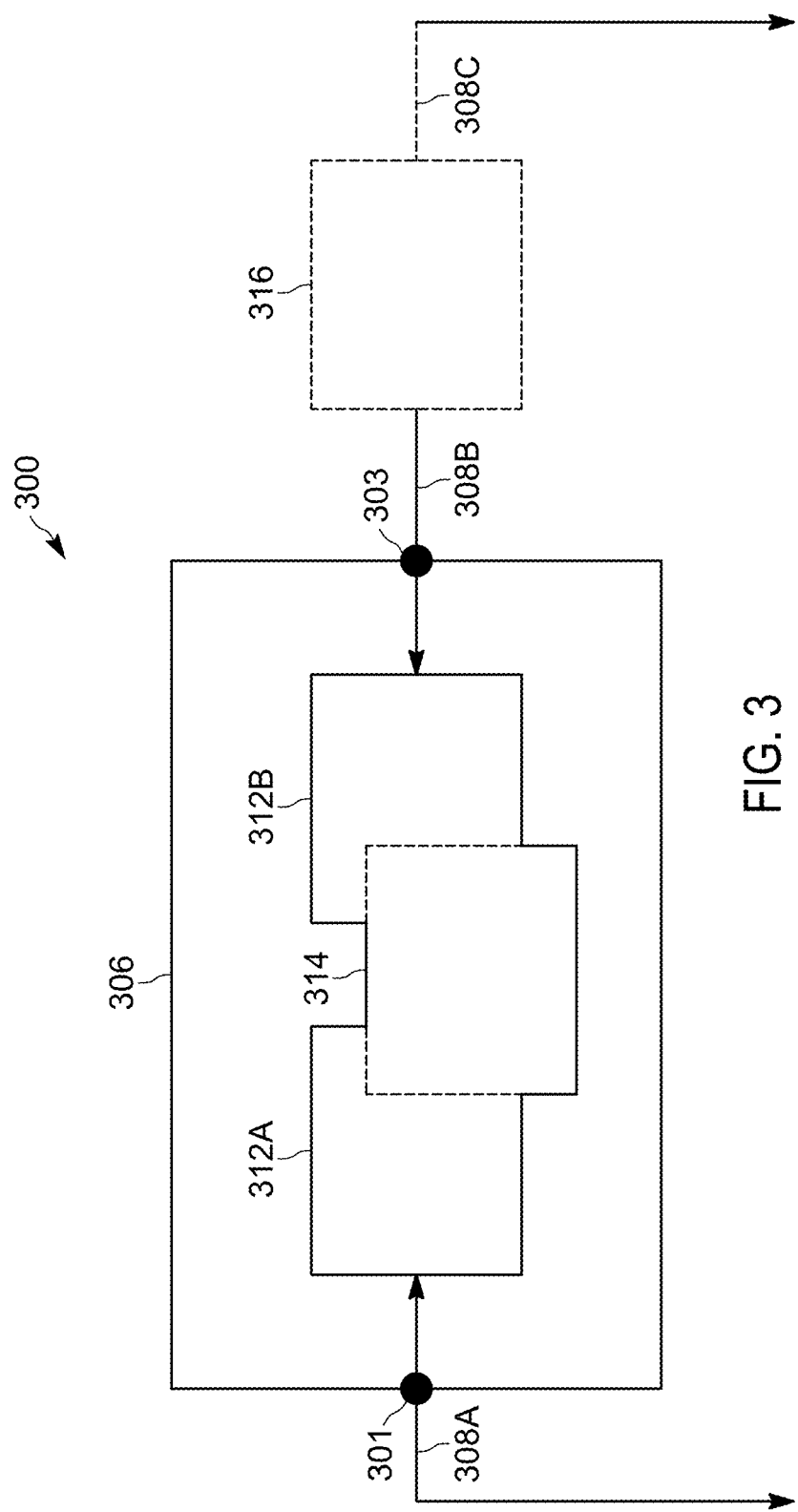
FIG. 3 is a block diagram illustrating selected elements of a circuit providing protection and galvanic isolation for a high-speed communication interface with optimized signal integrity, in accordance with some embodiments.

Referring now to FIG. 3, there is provided a block diagram illustrating selected elements of a circuit providing protection and galvanic isolation for a high-speed communication interface with optimized signal integrity, in accordance with some embodiments. Portable communication device 300 may include isolation circuit 306 coupled to high-speed communication bus 308A via terminal 301 and high-speed communication bus 308B via terminal 303. Terminals 301 and 303 may be coupled to two high-speed communication processors (not shown) via high-speed communication bus 308. For example, a first high-speed communication processor 202 (e.g., baseband processor) may be coupled to a second high-speed communication processor 204 (e.g., application processor) via a high-speed communication bus 208 in the same portable communication device 200 as described for FIG. 2A. As another example, a first high-speed communication processor of radio 205 (e.g., radio transmitter) may be coupled to a second high-speed communication processor of accessory 207 (e.g., remote speaker microphone) via a high-speed communication bus 208 as described for FIG. 2B, in which accessory 207 may be a separate device that is remote to radio 205, such as a remote portable accessory 207B. In some embodiments, isolation circuit 306 may be coupled to high-speed communication 308C via interface impedance discontinuity 316. Interface impedance discontinuity 316 may reflect one or more discontinuities caused by one or more connections or connectors associated with high-speed communication bus 308.

In various embodiments, high-speed communication bus 308A, 308B, and 308C may be portions of the same high-speed communication bus for portable communication device 300. High-speed communication bus 308A and 308B may be coupled to matching components (312A and 312B), which may be integrated together with protection components 314 to collectively match the impedance associated with high-speed communication bus 308A, 308B, and 308C, isolate high-speed communication bus 308A from high-speed communication bus 308B and 308C, and provide protection from overvoltage and overcurrent failure conditions in portable communication device 300. For example, the impedance associated with high-speed communication bus 308A and 308B may be approximately 90 ohm differential and the impedance of matching components 312A and 312B and protection components 314 may be approximately 45 ohm single-ended in which the reactance may be positive, corresponding to inductive reactance, or negative, corresponding to capacitive reactance. In various embodiments, an impedance of approximately 45 ohm single-ended may range between about 45 to 50 ohm single-ended based on one or more properties associated with the printed circuit board, including but not limited to the dielectric properties, trace thickness, spacing, and routing.

One or more components may be shared between matching components 312A and protection components 314 and between matching components 312B and protection components 314. For example, matching components 312A may include one or more components, such as a series resistor for matching impedances between circuitry. The series resistor may also provide protection from an overcurrent failure condition, such as a surge in current transmitted along high-speed communication bus 308A. As another example, protection components 314 may include one or more components, such as a capacitor chain to galvanically isolate voltages associated with high-speed communication bus 308B from voltages associated high-speed communication bus 308A. The capacitor chain of protection components 314 may also allow for a high-frequency signal associated with a high-speed communication signal to bypass resistance in series with terminal 303. As yet a further example, protection components 314 may include suppression diodes to provide protection from an overvoltage failure condition. The capacitance of the suppression diodes may be converted to an impedance using one or more inductors to contribute to matching impedances between circuitry.

In some embodiments, high-speed communication bus 308A, 308B, and 308C may include one or more signal lines to transmit communications. Each signal line may be coupled to circuitry for isolation, such as isolation circuit 306. For example, the signal lines may include one or more supply lines, one or more data lines, one or more control lines, one or more clock lines, or any suitable combination of supply, data, control, or clock lines. In some embodiments, one or more signal lines of high-speed communication bus 308A, 308B, and 308C may be paired together as a differential pair. For example, a positive differential data line and a negative differential data line may each be coupled to circuitry for isolation and protection and may collectively transmit data over high-speed communication bus 308A, 308B, and 308C. In some embodiments, high-speed communication bus 308A, 308B, and 308C may be configured for bi-directional high-speed communication to transmit and receive information. Isolation circuit 306 may be coupled to high-speed communication bus 308A, 308B, and 308C and may support isolation and protection for bi-directional high-speed communication with matching components 312A for communication signals received and passed through on high-speed communication bus 308A, matching components 312B for communication signals received and passed through on high-speed communication bus 308B, and protection components 314 for high-speed communication bus 308A, 308B, and 308C.

Figure 4:
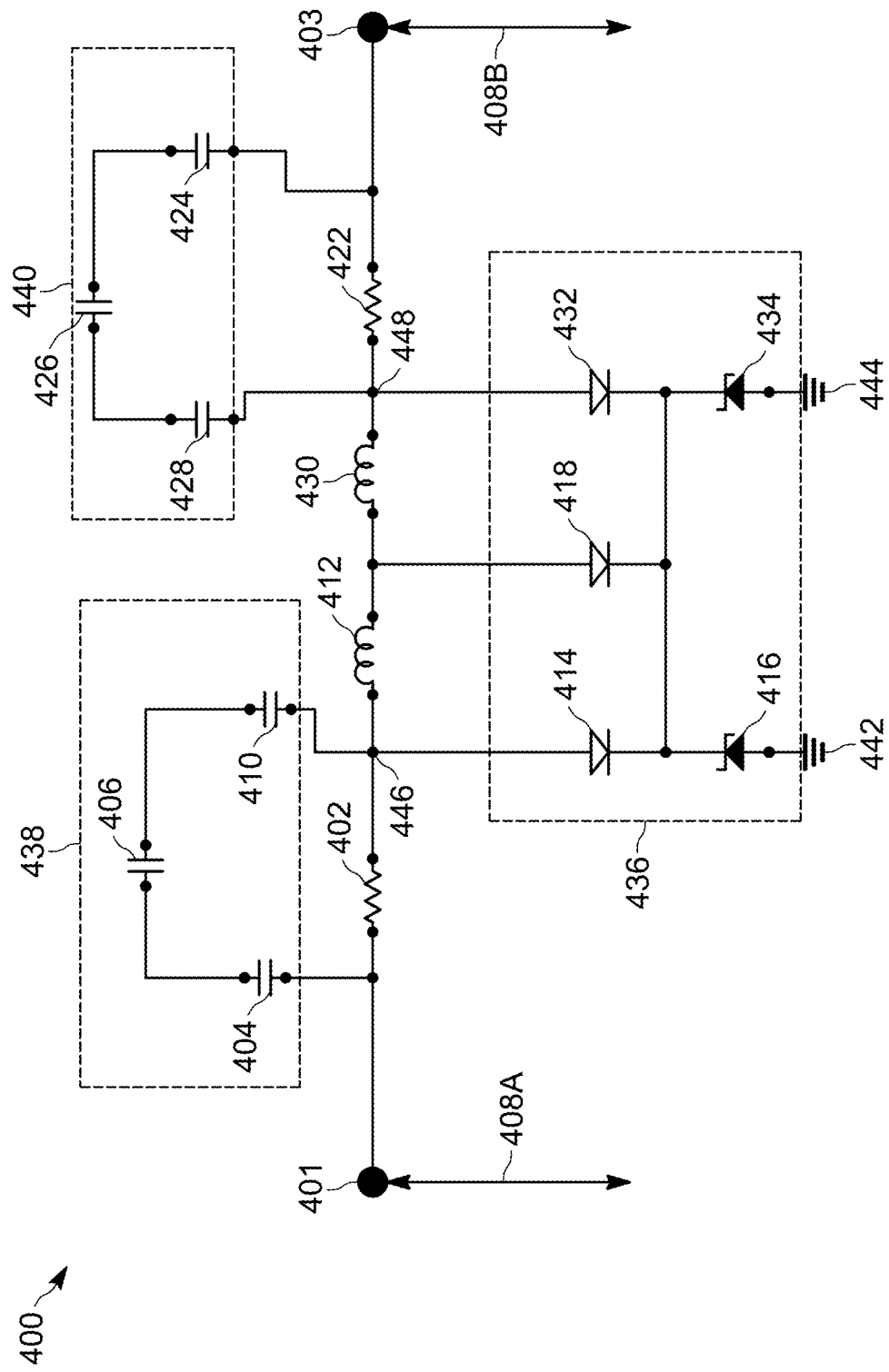
FIG. 4 is a schematic illustrating selected elements of a circuit providing protection and galvanic isolation for a high-speed communication interface with optimized signal integrity, in accordance with some embodiments.

Referring now to FIG. 4, there is provided a schematic illustrating selected elements of a circuit for providing protection and galvanic isolation for a high-speed communication interface with optimized signal integrity, in accordance with some embodiments. The isolation circuit 400 may be coupled to a high-speed communication interface, such as the high-speed communication bus 408A and 408B. Terminals 401 and 403 may be the first and second terminals of isolation circuit 400 coupled to two high-speed communication processors (not shown) via the high-speed communication bus 408A and 408B. For example, a first high-speed communication processor 202 (e.g., baseband processor) may be coupled to a second high-speed communication processor 204 (e.g., application processor) via a high-speed communication bus 208 in the same portable communication device as described for FIG. 2A. As another example, a first high-speed communication processor of radio 205 (e.g., radio transmitter) may be coupled to a second high-speed communication processor of accessory 207 (e.g., remote speaker microphone) via a high-speed communication bus 208 as described for FIG. 2B, in which accessory 207 may be a separate device that is remote to radio 205, such as a remote portable accessory 207B. In some embodiments, the input impedance of the high-speed communication bus 408A and 408B may be approximately 45+j0 ohm single-ended or approximately 90+j0 ohm differential. In various embodiments, an impedance of approximately 45+j0 ohm single ended may range from about 45 to 50 ohm single-ended based on one or more properties associated with the printed circuit board, including but not limited to the dielectric properties, trace thickness, spacing, and routing.

In some embodiments, the high-speed communication bus 408A and 408B may include one or more signal lines to transmit communications. Each of the signal lines may be coupled to circuitry for isolation. For example, isolation circuit 400 may be coupled to the high-speed communication bus 408A and 408B and may support isolation for bi-directional high-speed communication with one or more components for communication signals received and passed through on the high-speed communication bus 408A, one or more components for communication signals received and passed through on the high-speed communication bus 408B, and one or more components for communication signals received and passed through on the high-speed communication bus 408A and 408B. Although isolation circuit 400 may support isolation for bi-directional high-speed communication, isolation circuit 400 may be used for uni-directional high-speed communication in which communications may be received at the same terminal, such as terminal 401. For example, isolation circuit 400 may include resistor 402, capacitor chain 438, inductor 412, and suppression diodes 436.

In some embodiments, isolation circuit 400 may include resistor 402 coupled to first terminal 401 and resistor 422 coupled to second terminal 403. Resistor 402 may limit the current transferred along a high-speed communication bus, such as high-speed communication bus 408A, for communication signals received at first terminal 401 and resistor 422 may limit the current transferred along the high-speed communication bus, such as high-speed communication bus 408B, for communication signals received at second terminal 403. High-speed communication bus 408A may be coupled to a first high-speed communication processor (not shown) and high-speed communication bus 408B may be coupled to a second high-speed communication processor (not shown). Resistors 402 and 422 may protect one or more diodes in suppression diodes 436 from damage by limiting the current in isolation circuit 400. Resistors 402 and 422 may also provide protection from an overcurrent failure condition, which may be caused by the release of energy from a capacitive source or direct current (DC) rushing into the high-speed communication bus or a clock, data, or control line of a high-speed communication bus. Absent protection from an overcurrent failure condition, the released energy may cause a spark, which in hazardous environments may result in the ignition of potentially gaseous or explosive materials. Intrinsically safe devices may be required to provide protection from an overcurrent failure condition to prevent spark ignition.

Resistor 402 may also provide resistance for matching the impedance of isolation circuit 400 to the input impedance of the high-speed communication bus 408A at first terminal 401. In addition, resistor 422 may also provide resistance for matching the impedance of isolation circuit 400 to the input impedance of the high-speed communication bus 408B at second terminal 403. In some embodiments, resistors 402 and 422 may be used to match the input impedance of the high-speed communication bus 408A and 408B at terminals 401 and 403, which may be approximately 45+j0 ohm single-ended or approximately 90+j0 ohm differential. In addition, isolation circuit 400 may have a positive or negative reactance. In at least some embodiments, resistor 402 and resistor 422 may each be approximately 130 ohm or 150 ohm.

In various embodiments, resistor 402 may be coupled in parallel to capacitor chain 438 and resistor 422 may be coupled in parallel to capacitor chain 440. Capacitor chain 438 and capacitor chain 440 may each include one or more capacitors, such as capacitors 404, 406, and 410 in capacitor chain 438 or capacitors 424, 426, and 428 in capacitor chain 440. The capacitors in capacitor chain 438 and capacitor chain 440 may have the same or different capacitances. When capacitor chain 438 or 440 includes a plurality of capacitors, capacitor chain 438 or 440 may enable redundancy in the event that one or more capacitors in capacitor chain 438 or 440 fail. The failure of a capacitor may form a short across the terminals of the capacitor. For example, when capacitor 410 fails, a short may form between capacitor 406 and resistor 402, but a short-circuit path may not form across the two terminals of resistor 402 because capacitors 404 and 406 would remain in operation in parallel with resistor 402. As another example, when capacitors 424 and 426 fail, a short may form across capacitors 424 and 426, but a short-circuit path may not form across the two terminals of resistor 422 because capacitor 428 would remain in operation in parallel with resistor 422.

Capacitor chain 438 may provide galvanic isolation for first terminal 401 and capacitor chain 440 may provide galvanic isolation for second terminal 403. Galvanic isolation may enable high-frequency signal transmission between circuitry operating at different voltages. For example, a device coupled to first terminal 401 may operate at a first predefined voltage level and another device coupled to second terminal 403 may operate at a second predefined voltage level. Galvanic isolation may also enable protection from electrical surges, including but not limited to fast electrical transients and electrostatic discharge. In portable battery-operated electronic communication devices, isolation with, for example, a transformer, may be unacceptable due to the size, cost, and power consumed by the isolation device. For example, using a transformer requires additional size and space, and draws additional power. In addition, the transformer may ordinarily reduce signal integrity for high-speed communications, decrease battery life, and require a wired power charging cable for a portable battery-operated electronic communication device. As another example, using a transformer or optocoupler may increase the costs of the portable battery-operated electronic communication device. As described herein, galvanic isolation with a capacitor chain may provide similar levels of protection in a manner that is compact in size, cost sensitive in implementation, and minimizes power consumption of the overall device by avoiding the use of isolation devices, such as transformers.

Capacitor chain 438 may provide an alternative signal path around resistor 402 and may pass through high-frequency signals received at first terminal 401. In addition, capacitor chain 440 may provide an alternative signal path around resistor 422 and may pass through high-frequency signals received at second terminal 403. In some embodiments, the high-frequency signals may have a fundamental frequency of 4 MHz of greater. A circuit supporting the high-frequency signals, such as isolation circuit 400, may need to support a bandwidth that is approximately 10 to 11 harmonics of the fundamental frequency, such as approximately 40 to 44 MHz or greater. In addition, capacitor chain 438 and capacitor chain 440 may resist the transmission of low-frequency signals, which may have a fundamental frequency below 4 MHz and may include direct-current (DC) signals, including but not limited to a DC current passed on a DC voltage supply. In at least some embodiments, capacitors 404, 406, 410, 424, 426, and 428 may each be approximately 6.8 nanofarads (nF).

Although the high-speed communication bus 408 may ordinarily be used for high-frequency signal transmission, the high-speed communication bus 408 may also support additional states, such as one or more handshaking or idle states, in which communications may be represented with low-frequency signal transmissions. Resistor 402 may pass low-frequency signals received at first terminal 401 and resistor 422 may pass low-frequency signals received at second terminal 403 to support these additional states and to support a DC current passed on a DC voltage supply.

Resistor 402 and resistor 422 may also be coupled to suppression diodes 436, which may protect first terminal 401 and second terminal 403 against an overvoltage failure condition. When the voltage at node 446 or node 448 exceeds one or more predefined thresholds corresponding to an overvoltage failure condition, suppression diodes 436 may discharge the excessive voltage to ground. Suppression diodes 436 may ensure a predefined voltage level for a voltage supply provided to the isolation circuit 400 and other intrinsically safe circuitry, such as another device coupled to the high-speed communication bus. The predefined voltage level may be maintained by limiting, also known as clamping, the voltage level of the first terminal 401 or second terminal 403. Absent protection from an overcurrent failure condition, the energy when released may cause a spark, which in hazardous environments may result in the ignition of potentially gaseous or explosive materials. Intrinsically safe devices may be required to provide protection from an overvoltage failure condition to prevent spark ignition. An overvoltage failure condition may be caused, for example, by the voltage supply (e.g., a battery) associated with the predefined voltage level present during normal operating conditions.

For example, switching diode 414 and zener diode 416 of suppression diodes 436 may be coupled in series between resistor 402 and ground reference 442. When the voltage at node 446 exceeds one or more thresholds associated with switching diode 414 and zener diode 416, current may conduct from resistor 402 through switching diode 414 and zener diode 416 to ground reference 442. When the voltage across switching diode 414 and zener diode 416 no longer exceeds the thresholds, switching diode 414 and zener diode 416 may turn off and current may no longer be conducted to ground reference 442. In some embodiments, suppression diodes 436 may include one or more redundant switching diodes, such as switching diode 418, and one or more redundant zener diodes, such as zener diode 434. At least in some embodiments, the threshold of the switching diode may be approximately 0.7 volts and the threshold of the zener diode may be approximately 5.6 volts. Although suppression diodes 436 is shown with three switching diodes and two zener diodes, one or more switching diodes may be coupled to one or more zener diodes.

As another example, switching diode 432 and zener diode 434 of suppression diodes 436 may be coupled in series between resistor 422 and ground reference 444. When the voltage at node 448 exceeds one or more thresholds associated with switching diode 432 and zener diode 434, current may conduct from resistor 422 through switching diode 432 and zener diode 434 to ground reference 444. When the voltage across switching diode 432 and zener diode 434 no longer exceeds the threshold, switching diode 432 and zener diode 434 may turn off and current may no longer be conducted to the ground reference 444. In some embodiments, suppression diodes 436 may include one or more redundant switching diodes, such as switching diode 418, and one or more redundant zener diodes, such as zener diode 416. In at least some embodiments, the switching diode may be a high-speed switching diode, such as a BAS16 series switching diode, and the zener diode may be a zener diode with a high electrostatic discharge (ESD) tolerance, such as a KDZV4 zener diode.

The capacitance associated with the zener diodes in suppression diodes 436 may ordinarily degrade the signal integrity of communication signals transmitted on the high-speed communication bus, which may result in non-compliance with requirements for high-speed communications. However, one or more switching diodes coupled in series to a zener diode, such as switching diode 414 in series with zener diode 416, may reduce the effective capacitance associated with the zener diodes. In various embodiments, one or more inductors, such as inductors 412 and inductor 430, may be coupled to suppression diodes 436 to convert the capacitance associated with suppression diodes 436 to an impedance associated with suppression diodes 436. The inductors 412 and 430 may also be coupled in series to first resistor 402 and second resistor 422. The impedance associated with suppression diodes 436 may match the impedance associated with the high-speed communication bus. For example, the impedance associated with the high-speed communication bus 408 may be approximately 90 ohm differential or between 45 and 50 ohm single-ended and the impedance associated with the isolation circuit 400 including suppression diodes 436 may be between 45 and 50 ohm single-ended. In various embodiments, the impedance associated with isolation circuit 400 may range from about 45 to 50 ohm single-ended based on one or more properties associated with the printed circuit board, including but not limited to the dielectric properties, trace thickness, spacing, and routing. The conversion of the capacitance associated with suppression diodes 436 to an impedance associated with suppression diodes 436 may thereby maintain and optimize signal integrity of communication signals received at first terminal 401 or second terminal 403. The inductors 412 and 430 may each have small values to reduce the voltage across the inductor when transmitting alternating current (AC) signals associated with high-speed communications. In at least some embodiments, inductor 412 and inductor 430 may each be 1 nanohenry (nH).

Figure 5A:
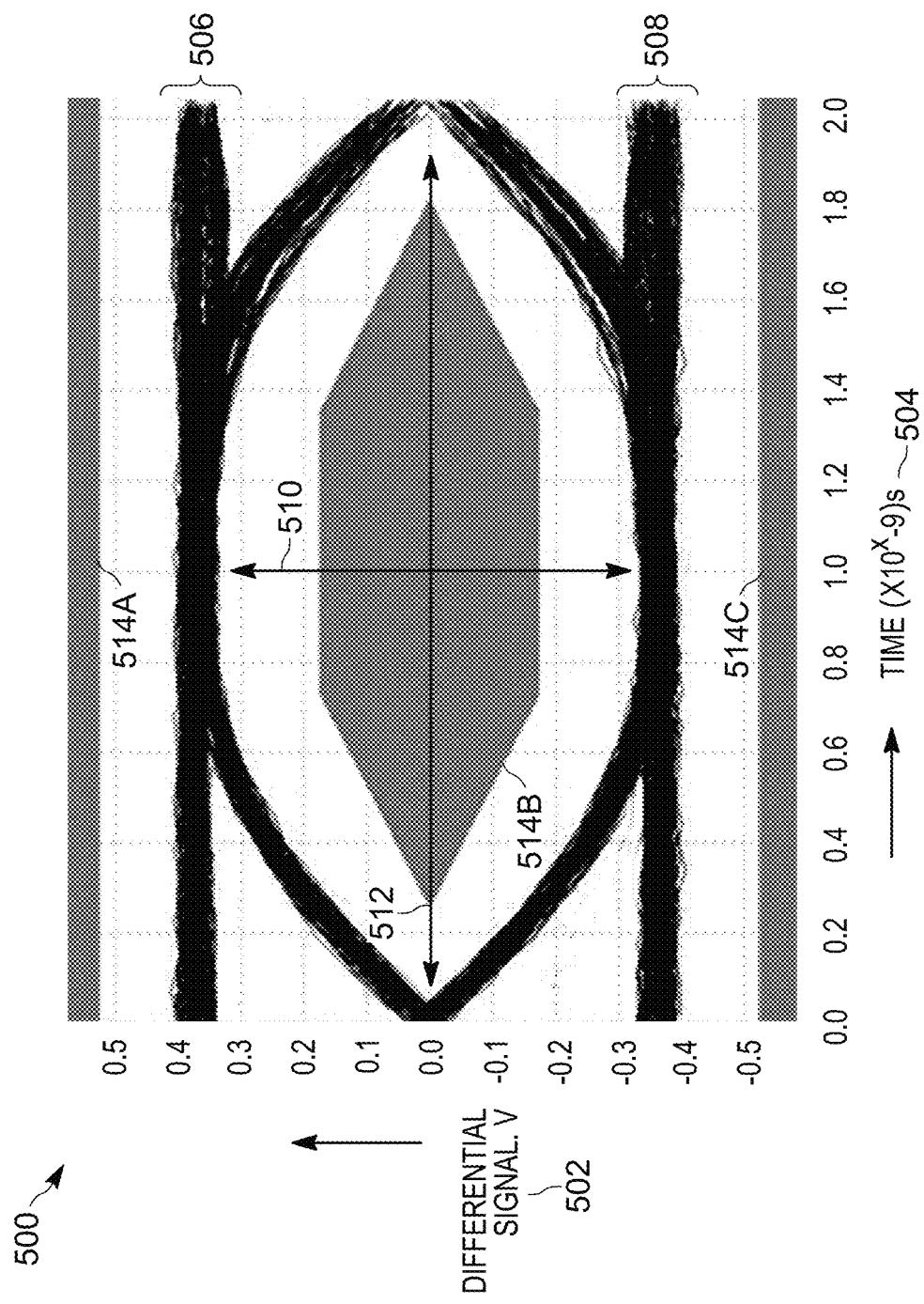
FIG. 5A is an eye diagram illustrating a compliance test performed on a high-speed communication interface with protection and galvanic isolation providing optimized signal integrity, in accordance with some embodiments.

Referring now to FIG. 5A, there is provided an eye diagram 500 illustrating a compliance test performed on a high-speed communication interface with protection and galvanic isolation providing optimized signal integrity, in accordance with some embodiments. Eye diagram 500 may visually represent a high-speed digital signal to determine important parameters of optimized signal integrity. The representation may depict a plurality of samples of the signal over time corresponding to multiple data transmissions. The horizontal axis 504 of eye diagram 500 may represent time, which may be measured in nanoseconds and the vertical axis 502 of eye diagram 500 may represent differential voltage for a high-speed communication signal.

To pass the compliance test with optimized signal integrity, these samples may not fall in one or more compliance regions. The compliance regions may include top compliance region 514a, middle compliance region 514b, and bottom compliance region 514c. The top compliance region 514a may limit the positive differential voltage level associated with logic one 506 and bottom compliance region 514c may limit the negative differential voltage level associated with logic zero 508. In addition, middle compliance region 514b may set the minimum size of the data eye and corresponding parameters, including but not limited to the rise time, fall time, bit period, consecutive jitter, paired JK jitter, and paired KJ jitter.

The rise time may represent a measurement of the average time to transition along the positive slope of the signal in the eye diagram and fall time may represent a measurement of the average time to transition along the negative slope of the signal in the eye diagram. The rise and fall times may be defined at any suitable point along the slope, such as 20 and 80 percent of the slope or 10 and 90 percent of the slope. For high-speed communications, the rise and fall time may be defined in picoseconds.

The width of the data eye 512, also referred to as the eye width 512, may represent a measurement of the horizontal opening of the data eye. The eye width 512 may be calculated by taking the difference between the average crossing points. Similarly, the bit period may represent a measurement of the horizontal opening of the data eye at the crossing level, which may represent the mid-point of the data eye. The data rate may be defined as the inverse of the bit period. The height of the data eye 510, also referred to as eye height 510, may represent a measurement of the vertical opening of the data eye. The eye height 510 may be calculated by taking the difference between the lowest voltage level corresponding to logic one 506 and the highest voltage level corresponding to logic zero 508. The optimized eye height may be the difference between the logic one 506 and logic zero 508, which may yield the highest signal to noise ratio for the high-speed communication. As shown in FIG. 5A, the eye height 510 and eye width 512 are significantly greater than the height and width of middle compliance region 514b, which may indicate that the signal-to-noise ratio of the high-speed communication is in compliance for optimized signal integrity.

The eye diagram may also illustrate jitter, which may represent the deviation of samples between transmissions of data. There may be several types of jitter represented in an eye diagram. For example, consecutive jitter may measure jitter for each consecutive data bit. It may be calculated using the data rate of the signal. As another example, paired JK jitter may measure jitter for paired differential data transitions, such as "01" next to "10" on a positive differential data line and "10" next to "01" on a negative differential data line. As a further example, paired KJ jitter may measure jitter for paired differential data transitions that are the inverse of JK jitter, such as "10" next to "01" on a positive differential data line and "01" next to "10" on a negative differential data line. In the eye diagram shown in FIG. 5A, the consecutive jitter may be approximately 21 picoseconds root-mean squared (RMS), the JK jitter may be approximately 15 picoseconds RMS, and the KJ jitter may be approximately 16 picoseconds RMS.

Figure 5B:
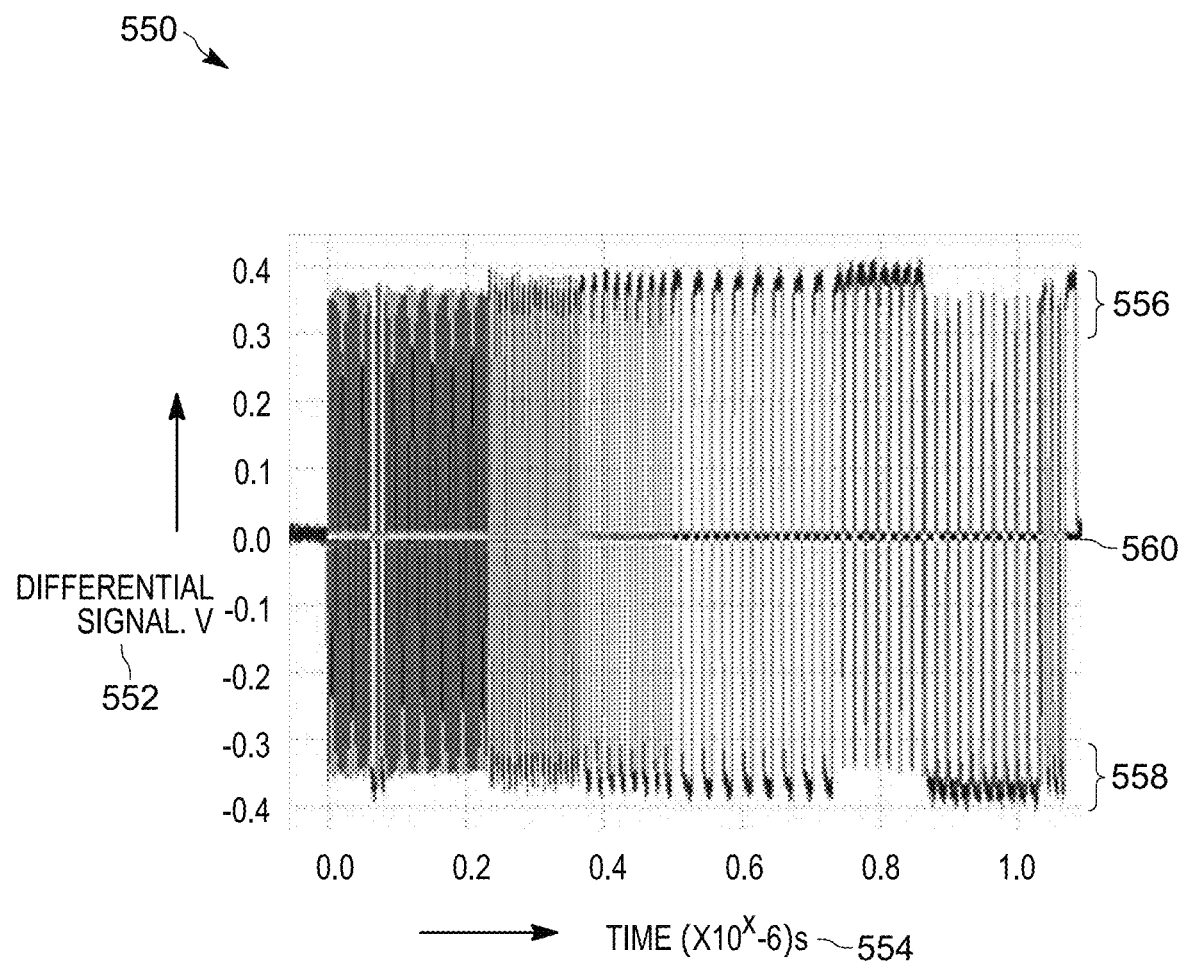
FIG. 5B is a waveform diagram illustrating a compliance test performed on a high-speed communication interface with protection and galvanic isolation providing optimized signal integrity, in accordance with some embodiments.

Referring now to FIG. 5B, there is provided a waveform diagram 550 illustrating a compliance test performed on a high-speed communication interface with protection and galvanic isolation providing optimized signal integrity, in accordance with some embodiments. The horizontal axis 554 of waveform diagram 550 may represent time, as may be measured in microseconds, and the vertical axis 552 of waveform diagram 550 may represent a differential voltage for a differential data line of a bi-directional high-speed communication bus in which the differential data line includes a positive differential data line and a negative differential data line. The signal plotted on waveform diagram 550 may oscillate between a logic high level 556 and a logic low level 558. Waveform diagram 550 also shows a crossing level 560, which represents the mid-point of the plotted signal, which may be between logic high level 556 and logic low level 558. As shown in FIG. 5B, crossing level 560 is near 0.0 volts or approximately 50% of the difference between the logic high level 556 and logic low level 558.

Figure 6:
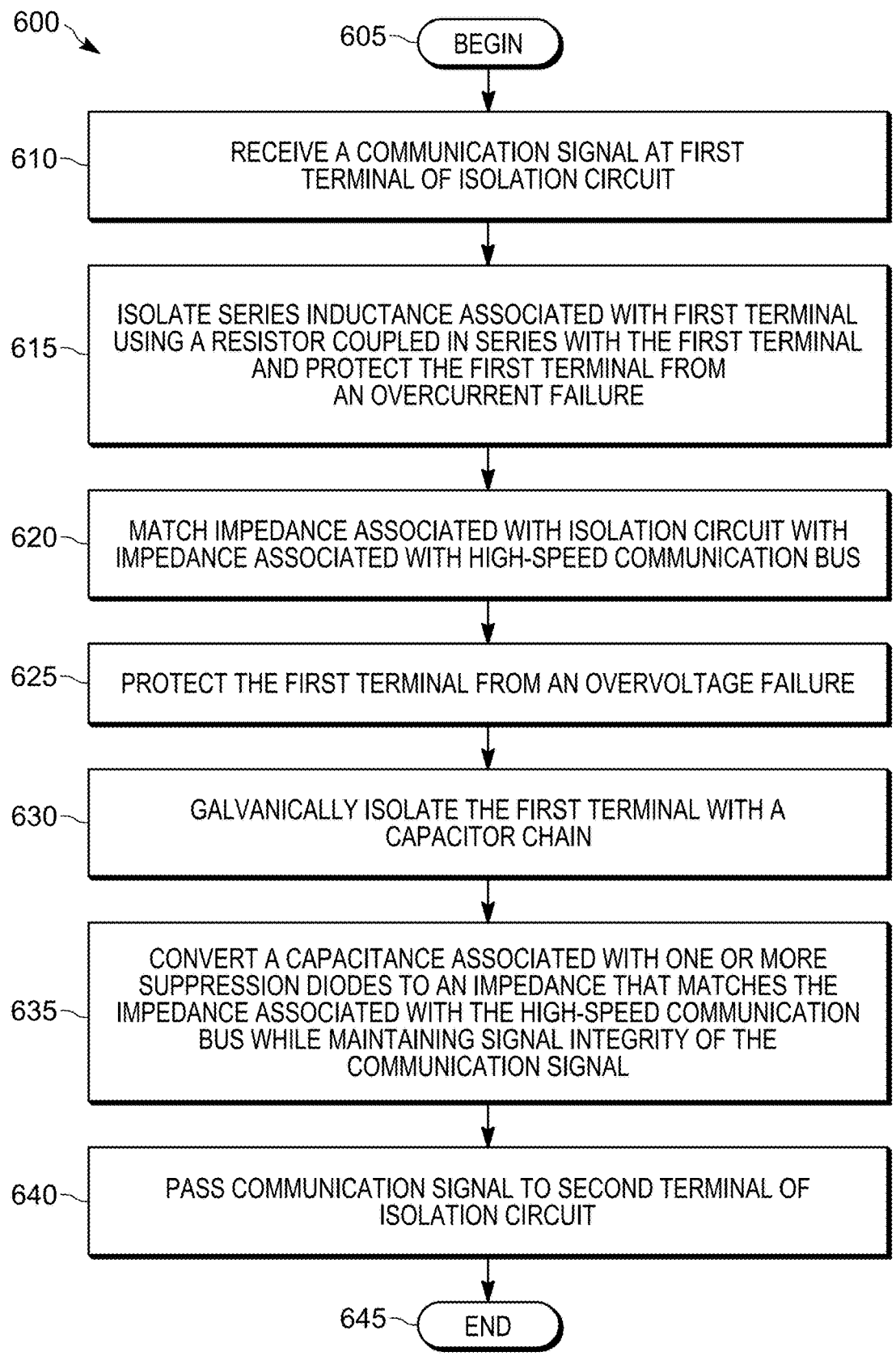
FIG. 6 is a flowchart illustrating selected elements of an example method for providing protection and galvanic isolation for a high-speed communication interface with optimized signal integrity, in accordance with some embodiments.

Referring now to FIG. 6, there is provided a flowchart illustrating selected elements of an example method 600 for providing protection and galvanic isolation for a high-speed communication interface with optimized signal integrity, in accordance with some embodiments. While a particular order of operation is indicated in FIG. 6 for illustrative purposes, the timing and ordering of such operations may vary where appropriate without negating the purpose and advantages of the examples set forth in detail throughout the remainder of this disclosure.

In the example embodiment illustrated in FIG. 6, method 600 begins with block 605 and continues with block 610, with receiving a communication signal at a first terminal of the isolation circuit. The first terminal may be coupled to a high-speed communication processor via a high-speed communication bus. For example, the communication signal may be received at a terminal of isolation circuit 206 as described for FIGS. 2A and 2B. The communication signal may be sent by a first high-speed communication processor via the high-speed communication bus. For example, first high-speed communication processor 202 (e.g., baseband processor) may send a communication signal to second high-speed communication processor 204 (e.g., application processor) as described for FIG. 2A. As another example, a first high-speed communication processor of radio 205 (e.g., radio transmitter) may send a communication signal to a second high-speed communication processor of accessory 207 (e.g., remote speaker microphone) as described for FIG. 2B, in which accessory 207 may be a separate device that is remote to radio 205, such as a remote portable accessory 207B. As a further example, the communication signal may be received at a terminal of isolation circuit 306 or a terminal of matching components 312A as described for FIG. 3. As yet another example, the communication signal may be received at terminal 401 or terminal 403 of isolation circuit 400 as described for FIG. 4.

In some embodiments, the high-speed communication bus may be any suitable high-speed communication bus for portable battery-operated communication devices including, but not limited to, Universal Serial Bus (USB), Mobile Industry Process Interface (MIPI), Ethernet, High-Definition Multimedia Interface (HDMI), Radio Frequency Front-End Control Interface (RFFE), QLINK, and QuickCharge (QC) protocol interface. The high-speed communication bus may support transmission of communications at a data rate corresponding to signals having a fundamental frequency of 4 MHz or greater, including but not limited to 480 megabits/second (High Speed), 5 gigabits/second (SuperSpeed), 10 gigabits/second or greater (SuperSpeed+ and/or Thunderbolt 3), 3.96 gigabits/second or greater (HDMI version 1.0 or greater), radio frequency front-end (RFFE) signals (e.g., 52 MHz), and QLINK signals. The high-speed communication bus may also support handshaking and idle states that transmit communications at a much lower data rate corresponding to low-frequency signals that may be associated with direct current (DC) signaling.

The isolation circuit may be intrinsically safe and configured to operate in a hazardous environment. Circuits or devices used in hazardous environments may contain safety components to protect users from potentially gaseous or explosive elements by, for example, preventing a spark, static discharge, or limiting heat energy below a sufficient level that may cause an explosion under normal or failure conditions. Circuits or devices may limit energy in one or more forms, including but not limited to power, heat, voltage, current, capacitance, and inductance, to safe levels for a particular environment. In such hazardous environments, the barrier may limit the amount of energy in one or more forms, including but not limited to power, voltage, current, capacitance, and inductance, to safe levels for circuitry that is protected and circuitry that is exposed to a potentially gaseous or explosive atmosphere. Design requirements for the isolation circuit may require certification for intrinsically safe operation. The certification may require protection against overcurrent or overvoltage failure conditions, which may be implemented using circuitry to limit the power, voltage, or current to safe levels in hazardous environments with potentially gaseous or explosive elements. The isolation circuit may limit the amount of transient current that traverses the high-speed communication bus by providing galvanic isolation and discharge potentially dangerous voltages.

At 615, a series inductance associated with the high-speed communication bus and the first terminal coupled to the high-speed communication bus may be isolated using a resistor coupled to the first terminal of the isolation circuit. The resistor may also protect the first terminal from an overcurrent failure condition. For example, the resistor may be resistor 402 as described for FIG. 4, which may be coupled to terminal 401 to isolate the series inductance associated with the high-speed communication bus 408A. The resistor may be used to limit the current that traverses the high-speed communication bus, which may protect against the overcurrent failure condition.

At 620, an impedance associated with the isolation circuit may be matched to an impedance of the high-speed communication bus. In some embodiments, the high-speed communication bus may include one or more data lines of a universal serial bus (USB) that may be configured for bi-directional high-speed communication. The high-speed communication bus and data lines of the bus may have an associated impedance of approximately 90 ohm differential and the impedance of the isolation circuit may be between 45 and 50 ohm single-ended. The impedance associated with the bi-directional high-speed communication bus may vary slightly based on one or more properties, such as properties of the printed circuit board, dielectric, trace thickness, and trace spacing. For example, the impedance may range from about 45 to 50 ohm single-ended based on one or more properties associated with the printed circuit board, including but not limited to the dielectric properties, trace thickness, spacing, and routing.

One or more components may be used to perform the matching. For example, inductor 412 as described for FIG. 4 may be coupled to suppression diodes to convert a capacitance associated with the suppression diodes to an impedance associated with the suppression diodes that matches the impedance associated with the high-speed communication bus. As another example, the resistance of resistor 402 as described for FIG. 4 may be selected to adjust the impedance of the isolation circuit to match the impedance associated with the high-speed communication bus such as high-speed communication bus 408A.

At 625, the first terminal of the isolation circuit may be protected from an overvoltage failure condition. In some embodiments, the protection may be provided by one or more suppression diodes that are coupled to the first terminal. For example, diodes 414 and 416 may provide overvoltage failure protection for terminal 401 and diodes 432 and 434 may provide overvoltage failure protection for terminal 403 as described for FIG. 4. Under an overvoltage failure condition, the voltage across the suppression diodes may be greater than one or more thresholds associated with the diodes which in turn may cause current to flow to a ground reference to discharge the abnormally high voltage associated with the overvoltage failure condition.

At 630, the first terminal may be galvanically isolated using a capacitor chain. The first terminal may be coupled to the capacitor chain and a resistor, and the capacitor chain may be coupled in parallel to the resistor. The capacitor chain may include one or more capacitors, such as capacitors 424, 426, and 428 of capacitor chain 440 as described for FIG. 4. Galvanic isolation may also enable protection from electrical surges, including but not limited to fast electrical transients and electrostatic discharge. In portable battery-operated electronic communication devices, isolation with, for example, a transformer, may be unacceptable due to the size, cost, and power consumed by the isolation device. For example, using a transformer requires additional size and space, and draws additional power. In addition, the transformer may ordinarily reduce signal integrity for high-speed communications, decrease battery life, and require a wired power charging cable for a portable battery-operated electronic communication device. As another example, using a transformer or optocoupler may increase the costs of the portable battery-operated electronic communication device. As described herein, galvanic isolation with a capacitor chain may provide similar levels of protection in a manner that is compact in size, cost sensitive in implementation, and minimizes power consumption of the overall device by avoiding the use of isolation devices, such as transformers.

At 635, a capacitance associated with the suppression diodes may be converted to an impedance associated with the suppression diodes. In various embodiments, the impedance associated with the suppression diodes may match an impedance associated with the high-speed communication bus. For example, the impedance of the high-speed communication bus may be approximately 90 ohm differential and the impedance associated with the isolation circuit and suppression diodes of the isolation circuit may be between 45 and 50 ohm single-ended. In various embodiments, the impedance of the isolation circuit may range from about 45 to 50 ohm single-ended based on one or more properties associated with the printed circuit board, including but not limited to the dielectric properties, trace thickness, spacing, and routing.

The conversion of the capacitance associated with the suppression diodes to the impedance associated with the suppression diodes may be performed using one or more inductors coupled in series to the first resistor. In some embodiments, the suppression diodes may include a switching diode and a zener diode coupled in series between at least one of the inductors and a ground reference. The suppression diodes may be configured to provide protection of one or more terminals from an overvoltage failure condition. For example, the suppression diodes may include switching diode 414 and zener diode 416 as described for FIG. 4 which may be coupled in series between inductor 412 and a ground reference. Under an overvoltage failure condition, the voltage across switching diode 414 and zener diode 416 may be greater than one or more thresholds associated with the diodes which may enable current to flow to a ground reference to discharge the abnormally high voltage associated with the overvoltage failure condition.

In various embodiments, the signal integrity of the communication signal may be maintained by one or more inductors coupled in series to the first resistor. For example, inductor 412 described for FIG. 4 may be coupled in series with resistor 402 and may maintain the signal integrity of a communication signal received at terminal 401. As another example, inductor 430 described for FIG. 4 may be coupled in series with resistor 422 and may maintain the signal integrity of a communication signal received at terminal 403.

At 640, the communication signal may be passed through to a second terminal of the isolation circuit. The second terminal may be coupled to the high-speed communication bus, which may be coupled to a second high-speed communication processor. The isolation circuit may be configured to pass through the communication signal without any need for retransmitting the communication signal that is received at the first terminal. The communication signal from the high-speed communication bus may be represented with one or more high-frequency signals, which may be passed through the isolation circuit using a capacitor chain, such as capacitor chain 438 as described for FIG. 4. In various embodiments, the capacitor chain may be coupled in parallel across the first resistor and coupled to the first terminal. The capacitor chain may provide galvanic isolation for the first terminal and may pass through high-frequency signals associated with the communication signal received at the first terminal, which may have a fundamental frequency of 4 MHz or greater.

In some embodiments, the capacitor chain, also as known as a capacitor ring, may be coupled across the first resistor and include one or more capacitors. When the capacitor chain includes a plurality of capacitors, the capacitors may provide additional protection when one of the capacitors in the capacitor chain fails causing a short circuit across the component. For example, capacitor 404 in the plurality of capacitors 404, 406, and 410, as described for FIG. 4, may fail causing a short between resistor 402 and capacitor 404. When this failure occurs, capacitors 406 and 410 may provide galvanic isolation for the first terminal and may pass through high-frequency signals associated with the communication signal received at terminal 401.

At 645, method 600 may terminate or in at least some embodiments, the operations shown in FIG. 6 may be repeated continuously to ensure that all communication signals along the high-speed communication bus are isolated and protected. In some embodiments, subsequent to passing the communication signal to a second terminal of the isolation circuit, another communication signal may be received at the first or second terminal, such as described for step 610. In at least some embodiments, the operations shown in FIG. 6 may be repeated for each terminal coupled to a high-speed communication bus that may correspond to a predefined voltage level.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, system or apparatus that comprises, has, includes, contains a list of elements does not include only those elements but may include other elements not expressly listed or inherent to such process, method, article, system or apparatus. An element preceded by "comprises . . . a", "has . . . a", "includes . . . a", "contains . . . a" does not, without more constraints, preclude the existence of additional identical elements in the process, method, article, system or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system, method, or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer-readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus, the following claims are hereby incorporated into the Detailed Description, with each claim standing on its own as a separately claimed subject matter.

We claim:

1. A portable battery-operated communication device, comprising:
   a high-speed communication bus;
   a first high-speed communication processor coupled to the high-speed communication bus, the first high-speed communication processor for transferring communication signals to a second high-speed communication processor over the high-speed communication bus;
   an isolation circuit for the high-speed communication bus, the isolation circuit comprising:
      a first terminal coupled to the high-speed communication bus, the first terminal configured to receive a first communication signal from the first high-speed communication processor via the high-speed communication bus;
      a first resistor coupled to the first terminal, the first resistor configured to protect the first terminal from an overcurrent failure condition, wherein the isolation circuit is configured to:
         match an impedance of the isolation circuit to an impedance associated with the high-speed communication bus;
         isolate series inductance associated with the first terminal;
         protect the first terminal from an overvoltage failure condition while maintaining signal integrity of the first communication signal; and
         pass through the first communication signal from the first terminal to a second terminal coupled to the high-speed communication bus.

2. The portable battery-operated communication device of claim 1, wherein the isolation circuit further comprises:
   a first capacitor chain coupled in parallel across the first resistor to provide galvanic isolation for the first terminal, wherein:
      the first capacitor chain comprises one or more capacitors;
      the pass through of the first communication signal from the first terminal to the second terminal comprises:
         pass through of a low-frequency signal associated with the first communication signal through the first resistor; and
         pass through of a high-frequency signal associated with the first communication signal through the first capacitor chain, wherein the high-frequency signal associated with the first communication signal has a fundamental frequency of 4 MHz or greater.

3. The portable battery-operated communication device of claim 1, wherein:
   the high-speed communication bus comprises one or more data lines of a universal serial bus configured for bi-directional high-speed communication, the impedance associated with the high-speed communication bus is 90 ohm differential; and
   the impedance of the isolation circuit is between 45 and 50 ohm single-ended.

4. The portable battery-operated communication device of claim 1, wherein the isolation circuit further comprises:
   a second resistor coupled to the second terminal, the second resistor configured to protect the second terminal from the overcurrent failure condition, wherein:
      the isolated series inductance is further associated with the second terminal;
      the second terminal is configured to receive a second communication signal from the second high-speed communication processor via the high-speed communication bus, wherein the high-speed communication bus is configured for bi-directional high-speed communication; and
      the isolation circuit is further configured to protect the second terminal from the overvoltage failure condition while maintaining signal integrity of the second communication signal.

5. The portable battery-operated communication device of claim 4, wherein the isolation circuit further comprises:
   a second capacitor chain coupled in parallel across the second resistor to provide galvanic isolation for the second terminal, wherein:
      the second capacitor chain comprises one or more capacitors;
      the pass through of the second communication signal from the second terminal to the first terminal comprises:
         pass through of a low-frequency signal associated with the second communication signal through the second resistor; and
         pass through of a high-frequency signal associated with the second communication signal through the second capacitor chain, wherein the high-frequency signal associated with the second communication signal has a fundamental frequency of 4 MHz or greater.

6. The portable battery-operated communication device of claim 1, wherein the isolation circuit further comprises:
   one or more suppression diodes coupled to the first resistor, the suppression diodes configured to provide the protection for the first terminal from the overvoltage failure; and
   one or more inductors coupled in series with the first resistor, wherein the inductors are:
      coupled to the suppression diodes; and
      configured to convert a capacitance associated with the suppression diodes to an impedance associated with the suppression diodes that matches the impedance associated with the high-speed communication bus thereby maintaining the signal integrity of the first communication signal.

7. The portable battery-operated communication device of claim 6, wherein the suppression diodes of the isolation circuit comprise a switching diode and a zener diode coupled in series between at least one of the inductors and a ground reference.

8. A method for isolated high-speed communication, comprising:
   receiving a communication signal at a first terminal of an isolation circuit, the first terminal coupled to a high-speed communication bus;
   isolating series inductance associated with the first terminal using a resistor coupled in series to the first terminal;
   matching an impedance of the isolation circuit at the first terminal to an impedance associated with the high-speed communication bus;
   protecting the first terminal from an overvoltage failure condition; and
   passing the communication signal to a second terminal of the isolation circuit, the second terminal coupled to the high-speed communication bus.

9. The method for isolated high-speed communication of claim 8, wherein:

the high-speed communication bus comprises one or more data lines of a universal serial bus configured for bi-directional high-speed communication, the impedance associated with the high-speed communication bus is 90 ohm differential; and the impedance of the isolation circuit is between 45 and 50 ohm single-ended.

10. The method for isolated high-speed communication of claim 8, wherein the impedance of the isolation circuit at the first terminal is matched using a first inductor coupled to the first terminal.

11. The method for isolated high-speed communication of claim 10, further comprising:

galvanically isolating the first terminal with a capacitor chain coupled in parallel across the resistor, wherein:
the capacitor chain is coupled to the first terminal;
the capacitor chain comprises one or more capacitors; and
the resistor is configured to protect the first terminal from an overcurrent failure condition.

12. The method for isolated high-speed communication of claim 11, further comprising:

converting a capacitance associated with one or more suppression diodes to an impedance associated with the suppression diodes that matches the impedance associated with the high-speed communication bus using one or more inductors coupled in series to the resistor;
maintaining signal integrity of the communication signal using the inductors, wherein:
the inductors comprise at least the first inductor coupled to the first terminal;
the suppression diodes are configured to provide the protection of the first terminal from the overvoltage failure condition; and
the suppression diodes comprise a switching diode and a zener diode coupled in series between at least one of the inductors and a ground reference.

13. The method for isolated high-speed communication of claim 11, wherein the passing of the communication signal comprises:

passing a low-frequency signal associated with the communication signal through the resistor; and
passing a high-frequency signal associated with the communication signal through the capacitor chain, wherein the high-frequency signal has a fundamental frequency of 4 MHz or greater.

14. A portable communication system, comprising:

a portable battery-operated communication device comprising:
a first high-speed communication processor;
an isolation circuit coupled to the first high-speed communication processor;
a portable accessory coupled to the portable battery-operated communication device via a wired cable, the portable accessory comprising a second high-speed communication processor;
a high-speed communication bus integrated in the wired cable, the high-speed communication bus coupled to the first high-speed communication processor of the portable battery-operated communication device, the second high-speed communication processor of the portable accessory, and the isolation circuit of the portable battery-operated communication device, the isolation circuit comprising:

a first terminal coupled to the high-speed communication bus, the first terminal configured to receive a first communication signal from the first high-speed communication processor via the high-speed communication bus;
a first resistor coupled to the first terminal, the first resistor is configured to protect the first terminal from an overcurrent failure condition;
the isolation circuit being configured to:
match an impedance of the isolation circuit to an impedance associated with the high-speed communication bus;
isolate series inductance associated with the first terminal;
protect the first terminal from an overvoltage failure condition while maintaining signal integrity of the first communication signal; and
pass through the first communication signal from the first terminal to a second terminal coupled to the high-speed communication bus.

15. The portable communication system of claim 14, wherein the isolation circuit of the portable battery-operated communication device further comprises:

a first capacitor chain coupled in parallel across the first resistor to provide galvanic isolation for the first terminal between the first high-speed communication processor and the second high-speed communication processor, wherein:
the first capacitor chain comprises one or more capacitors;
the pass through of the first communication signal from the first terminal to the second terminal comprises:
pass through of a low-frequency signal associated with the first communication signal through the first resistor; and
pass through of a high-frequency signal associated with the first communication signal through the first capacitor, wherein the high-frequency signal associated with the first communication signal has a fundamental frequency of 4 MHz or greater.

16. The portable communication system of claim 14, wherein:

the high-speed communication bus comprises one or more data lines of a universal serial bus configured for bi-directional high-speed communication, the impedance associated with the high-speed communication bus is 90 ohm differential; and
the impedance of the isolation circuit is between 45 and 50 ohm single-ended.

17. The portable communication system of claim 14, wherein the isolation circuit of the portable battery-operated communication device further comprises:

a second resistor coupled to the second terminal;
a second capacitor chain coupled in parallel across the second resistor to provide galvanic isolation for the second terminal between the second high-speed communication processor and the first high-speed communication processor, wherein:
the second resistor is configured to protect the second terminal from the overcurrent failure condition;
the second capacitor chain comprises one or more capacitors;
the isolated series inductance is further associated with the second terminal;
the second terminal is configured to receive a second communication signal from the second high-speed communication processor via the high-speed communication bus, wherein the high-speed communication bus is configured for bi-directional high-speed communication;

the isolation circuit is further configured to:
protect the second terminal from the overvoltage failure condition while maintaining signal integrity of the second communication signal;
pass through the second communication signal from the second terminal to the first terminal, wherein:
the second resistor passes through a low-frequency signal associated with the second communication signal; and
the second capacitor chain passes through a high-frequency signal associated with the second communication signal, wherein the high-frequency signal associated with the second communication signal has a fundamental frequency of 4 MHz or greater.

18. The portable communication system of claim 14, wherein the isolation circuit of the portable battery-operated communication device further comprises:
one or more suppression diodes coupled to the first resistor, the suppression diodes configured to provide the protection for the first terminal from the overvoltage failure; and
one or more inductors coupled in series with the first resistor, wherein the inductors are:
coupled to the suppression diodes; and
configured to convert a capacitance associated with the suppression diodes to an impedance associated with the suppression diodes that matches the impedance associated with the high-speed communication bus thereby maintaining the signal integrity of the first communication signal.

19. The portable communication system of claim 18, wherein the suppression diodes of the isolation circuit comprise a switching diode and a zener diode coupled in series between at least one of the inductors and a ground reference.

20. The portable communication system of claim 14, wherein:
the first high-speed communication processor and isolation circuit of the portable battery-operated communication device are configured to operate at a first predefined voltage;
the second high-speed communication processor of the portable accessory is configured to operate at a second predefined voltage, wherein:
the isolation circuit is intrinsically safe and configured to operate in a hazardous environment;
a first capacitance associated with the first predefined voltage is less than a first predefined capacitance limit;
a second capacitance associated with the second predefined voltage is less than a second predefined capacitance limit;
the first predefined voltage is greater than the second predefined voltage; and
the first predefined capacitance limit is less than the second predefined capacitance limit.

* * * * *